(12) United States Patent
Moyers et al.

(10) Patent No.: US 11,874,883 B2
(45) Date of Patent: *Jan. 16, 2024

(54) ENCAPSULATING VIRTUAL AREA BASED COMMUNICANT ASSEMBLIES

(71) Applicant: Sococo, Inc., Austin, TX (US)

(72) Inventors: Josh Moyers, Oakland, CA (US); David Van Wie, Eugene, OR (US)

(73) Assignee: Sococo, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,681

(22) Filed: Jun. 9, 2021

(65) Prior Publication Data

US 2021/0349952 A1 Nov. 11, 2021

Related U.S. Application Data

(63) Continuation of application No. 15/369,754, filed on Dec. 5, 2016, now Pat. No. 11,061,970, which is a
(Continued)

(51) Int. Cl.
| | |
|---|---|
| *G06F 16/951* | (2019.01) |
| *G06Q 10/107* | (2023.01) |
| *G06F 3/041* | (2006.01) |
| *G06F 16/28* | (2019.01) |
| *G06F 16/2457* | (2019.01) |

(Continued)

(52) U.S. Cl.
CPC ............ *G06F 16/951* (2019.01); *G06F 3/041* (2013.01); *G06F 3/0481* (2013.01); *G06F 16/24578* (2019.01); *G06F 16/284* (2019.01); *G06Q 10/107* (2013.01); *H04L 65/403* (2013.01); *H04L 67/1097* (2013.01)

(58) Field of Classification Search
CPC ...... G06F 16/951; G06F 3/041; G06F 3/0481; G06F 16/24578; G06F 16/284; G06Q 10/107; H04L 65/403; H04L 67/1097
See application file for complete search history.

(56) References Cited

U.S. PATENT DOCUMENTS

2004/0107255 A1* 6/2004 Ludwig .................. G06Q 10/10
709/204
2009/0254843 A1* 10/2009 Van Wie ............... H04L 67/131
707/999.005
(Continued)

OTHER PUBLICATIONS

Notice of Allowance dated Mar. 10, 2021, filed in U.S. Appl. No. 15/369,754, pp. 1-5.
(Continued)

*Primary Examiner* — Pei Yong Weng

(57) ABSTRACT

Realtime communications between communicants in a virtual area are administered. Assemblies of copresent communicants in the virtual area are detected. For each of respective ones of the detected assemblies, a respective meeting object linked to information relating to communicant interactions in the assembly is generated. Respective meeting summary data is determined based on the information linked to selected ones of the meeting objects meeting objects. The determined meeting summary data is transmitted to a network node for display. A visualization of summaries of respective assemblies of copresent communicants in the virtual area is presented on a display.

12 Claims, 15 Drawing Sheets

Related U.S. Application Data continuation of application No. 13/432,837, filed on Mar. 28, 2012, now Pat. No. 9,514,444.

(51) Int. Cl.
*G06F 3/0481* (2022.01)
*H04L 65/403* (2022.01)
*H04L 67/1097* (2022.01)

(56) References Cited

U.S. PATENT DOCUMENTS

| | | | | |
|---|---|---|---|---|
| 2009/0300521 | A1* | 12/2009 | Jerrard-Dunne | G06Q 10/10 715/757 |
| 2013/0218987 | A1* | 8/2013 | Chudge | H04L 51/043 709/206 |

OTHER PUBLICATIONS

Terminal Disclaimer Filed Feb. 22, 2021, filed in U.S. Appl. No. 15/369,754, pp. 1-2.
Terminal Disclaimer Approved Feb. 22, 2021, filed in U.S. Appl. No. 15/369,754, p. 1.
Response to Non-Final Office filed Feb. 21, 2021, filed in U.S. Appl. No. 15/369,754, pp. 1-10.
Non-Final Rejection dated Aug. 24, 2020, filed in U.S. Appl. No. 15/369,754, pp. 1-10.
Request for Continued Examination filed Jul. 7, 2020, filed in U.S. Appl. No. 15/369,754, pp. 1-12.
Final Rejection dated Jan. 7, 2020, filed in U.S. Appl. No. 15/369,754, pp. 1-10.
Response to Non-Final Office Action dated Sep. 30, 2019, filed in U.S. Appl. No. 15/369,754, pp. 1-10.
Preliminary Amendment filed Nov. 8, 2017, filed in U.S. Appl. No. 15/369,754, pp. 1-7.

\* cited by examiner

FIG. 12

Current Meeting in Sococo HQ > Daily Standup ← 556

Notes for Daily

Not all users in initial test connected to Vortex, fix requires changes in transport level. Eric starting to investigate, may need to involve transceiver, Bob will follow-up today.

Review project ranking, ID which ones still need sizing.

Enterprise Console – profile simplification options, overall schedule.

Decision to go with option Bob proposed (more time, but fixes performance, cleans up code) ← 546

Follow-ups ← 548

- Josh: Follow-up with Eric on PSTN fixes
- Yuka: Create API/Enterprise Management Console status spreadsheet
- Matt, Alex: Create job descriptions for Interaction Designer, Transport Engineer

[Add Follow-Up] [Praise this Meeting] [Comment]
       550              552              554

▽ Daily Standup    278
- Matt
- Yuka
- Josh
- Dan
- Ed
- Art

▽ Contacts    282
- Fran
- Garth

Chat  Invite

FIG. 13

ENCAPSULATING VIRTUAL AREA BASED COMMUNICANT ASSEMBLIES

CROSS-REFERENCE TO RELATED APPLICATIONS

This application relates to the following co-pending patent applications, the entirety of each of which is incorporated herein by reference:

U.S. patent application Ser. No. 12/818,517, filed Jun. 18, 2010;
U.S. patent application Ser. No. 12/855,210, filed Aug. 12, 2010;
U.S. patent application Ser. No. 12/630,973, filed Dec. 4, 2009;
U.S. patent application Ser. No. 12/418,243, filed Apr. 3, 2009;
U.S. patent application Ser. No. 12/354,709, filed Jan. 15, 2009;
U.S. patent application Ser. No. 12/825,512, filed Jun. 29, 2010;
U.S. patent application Ser. No. 12/630,973, filed Dec. 4, 2009;
U.S. patent application Ser. No. 12/509,658, filed Jul. 27, 2009;
U.S. patent application Ser. No. 13/165,729, filed Jun. 21, 2011;
U.S. patent application Ser. No. 13/209,812, filed Aug. 15, 2011;
U.S. Provisional Patent Application No. 61/563,088, filed Nov. 23, 2011;
U.S. Provisional Patent Application No. 61/535,910, filed Sep. 16, 2011;
U.S. Provisional Patent Application No. 61/373,914, filed Aug. 16, 2010;
U.S. Provisional Patent Application No. 61/444,989, filed Feb. 21, 2011; and
U.S. Provisional Patent Application No. 61/603,024, filed Feb. 24, 2012.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

FIGS. 11-16 are diagrammatic views of examples of graphical user interfaces.

DETAILED DESCRIPTION

Figure 1:
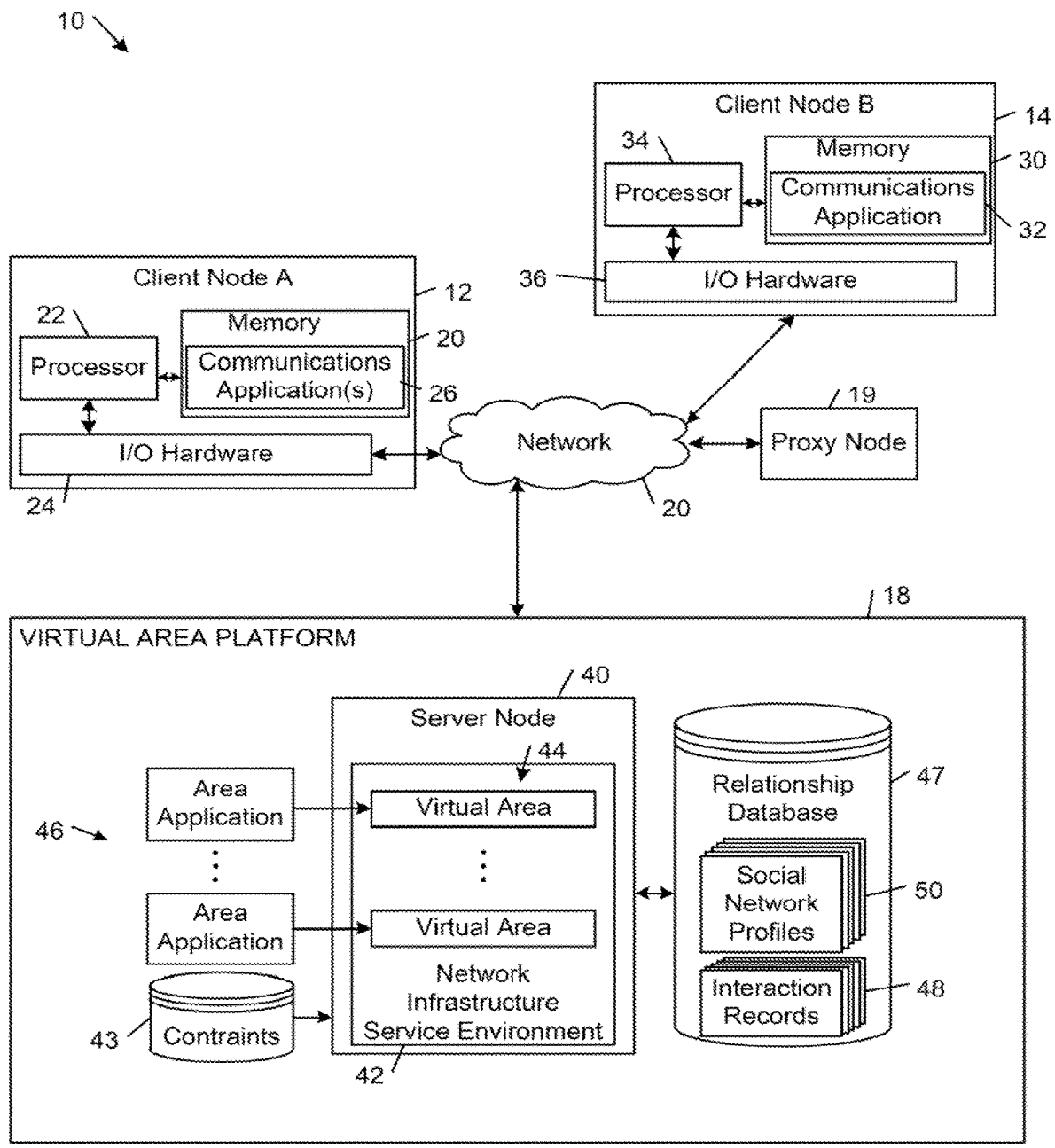
FIG. 1 is a diagrammatic view of an example of a network communications environment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Examples of types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area," a "place," or a "space") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "summary of an assembly" is a view on data associated with the assembly. In some examples, a summary of an assembly refers to a view on the data associated with the respective meeting object generated for that assembly.

As used herein, the term "includes" means includes but not limited to, the term "including" means including but not limited to. The term "based on" means based at least in part on.

II. Encapsulating Virtual Area Based Communicant Assemblies

The examples that are described herein provide systems and methods for encapsulating assemblies (e.g., meetings, informal gatherings, and the like) of communicants in one or more virtual areas. These examples provide a wide variety of ways in which to capture features of ongoing and completed assemblies and visualize those features at different levels of detail. Exemplary visualizations include an activity view that shows a time-based visualization of assemblies within a particular domain, and a timeline view that shows a scalable visualization of a selected subset of the assemblies within a particular domain. The domain may be predefined or specified by a user and may be used to select the assemblies that are presented in the visualizations. The assemblies may be filtered according to a variety of different attributes of the assemblies, including by virtual location (e.g., a particular virtual area or a particular zone of a virtual area in which the assemblies occurred), by communicant (e.g., one or more communicants who participated in the assemblies), and by time (e.g., a period during which the assemblies started or ended). The assembly visualizations allow communicants to readily obtain a quick summary of the activities occurring in a particular context (e.g., one or more of time, virtual location, participants involved, and types of information shared). They also increase the availability of assembly related information (e.g., notes, shared files, recordings, follow-up tasks, comments and other feedback) by allowing communicants to see and retrieve the information associated with the assemblies in a variety of different ways.

FIG. 1 shows an example of a network communications environment 10 that includes a first client network node 12 (Client Node A), a second client network node 14 (Client Network Node B), a virtual area platform 18 and an optional proxy node 19 that are interconnected by a network 20. The network 20 may include one or more of any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, video, and other data) between network nodes.

p The first client network node 12 includes a computer-readable medium 22 (or "memory"), a processor 24, and input/output (I/O) hardware 26 (including a display). The processor 24 executes at least one virtual area communications application 26 that is stored in the memory 22. The second client network node 14 typically is configured in substantially the same general way as the first client network node 12, with a computer-readable medium 30 storing at least one virtual area communications application 32, a processor 34, and I/0 hardware 36 (including a display).

Each of the network nodes 12, 14 has a respective set of one or more sources and an exemplary set of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display). Each source has an active state in which the source is available for originating data and an inactive state in which the source is not available for originating data. Likewise, each sink has an active state in which the sink is available for receiving data and an inactive state in which the sink is not available for receiving data. The communicants operating the client nodes 12, 14 typically can control the states of the sources and sinks using controls provided by the communications applications 26, 32. For example, in some examples, the communications applications 26, 32 provide user controls for turning on/off the local microphones and the local speakers (e.g., headsets) on the client network nodes 12, 14.

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains the records 48 of interactions between communicants and social network profiles 50 that are associated with respective communicants. Each interaction record describes the context of an interaction between a pair of communicants. In some examples, an interaction record contains one or more of an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. In some examples, each interaction is tracked independently such that, for a given pair of communicants, there is a list of relationship event records, each of which records a single respective interaction (e.g., sent a chat message, streamed audio for ninety-three seconds, shared file X, etc.). Thus, for each realtime interaction, the network infrastructure service environment 42 tracks when it occurred, where it occurred, and what happened during the interaction in terms of communicants involved (e.g., entering and exiting), objects that are activated/deactivated, and the files that were shared. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10.

In some examples, when a relationship triggering action occurs, a notification is sent from the server node 40 to a server node (e.g., the API server 432 described below) that updates the relationship database 47. The notification consists of a "relationship pair" which is the two users involved in the relationship and a "relationship event" which describes what happened or is happening. Event types include, for example, "talked with", "video with", "screen shared with", "text chatted with", "phoned or phoned by" and a couple we use for internal use—"paired with" and "hidden". Events can either be instantaneous or be started or stopped. For example, "talked with" starts and stops and a single interaction record is stored with start and stop times (e.g., when the microphone goes on and when it goes off), whereas "text chatted with" is instantaneous and a respective interaction record is stored for each message sent. Relationship events are always bi-directional (e.g., "Bob and Ed talked", "Bob and Ed spoke by phone"). In some examples, three relationship tables are created: a Relationship Pair table that has one record per pair of users; a Relationship Event table that stores the relationship event records; and a Relationship Event in Progress table that is identical in structure to the Relationship Event table but temporarily stores events that start and stop while they are in progress. The data in the Relationship Event table can be aggregated by day, month, and year with a weighting factor for discarding records when there is need to reduce the data in the table.

Additional details regarding the relationship database 47 and the search and retrieval functionalities associated with the relationship database as described in U.S. patent application Ser. No. 12/418,243, filed Apr. 3, 2009, and Ser. No. 12/354,709, filed Jan. 15, 2009.

The communications applications 26, 32, the area applications 46, and the network infrastructure service environment 42 together provide a platform that administers the realtime connections with network nodes in an instance of a virtual area subject to a set of constraints 43 (e.g., capabilities and other types of permissions, rules, and preferences).

Each of the virtual area applications 46 is hosted by a respective one of the virtual areas 44 and includes a description of the respective virtual area 44. Communicants respectively operating the client nodes 12, 14 connect to the virtual areas 44 through the virtual area communications applications 26, 32.

The communications applications 26, 32 typically present respective views of the virtual areas 44 in accordance with data received from the network infrastructure service environment 42. The communications applications 26, 32 also provide respective interfaces for receiving commands from the communicants and providing an interface that enhances the realtime communications between the communicants. The communicants typically are represented in the virtual areas 44 by respective avatars (e.g., sprites), which typically move about the virtual areas 44 in response to commands that are input by the communicants at their respective network nodes. In some examples, the communications applications 26, 32 establish realtime data stream connections between the first and second client network nodes 12, 14 and other network nodes connected to the virtual area 44 based on the positions of the communicants' avatars in the virtual areas 44. In some examples, each of the client network nodes 12, 14 includes a respective realtime kernel of the type described in U.S. patent application Ser. No. 12/630,973, filed Dec. 4, 2009, which supports remote configuration of stream handlers for processing data streams (e.g., rendering audio and video data streams) on a client network node.

In some examples, the server node 40 communicates with the client nodes 12, 14 and the proxy node 19 in accordance with the stream transport protocol described in U.S. patent application Ser. No. 12/825,512, filed Jun. 29, 2010, and U.S. patent application Ser. No. 12/630,973, filed Dec. 4, 2009. The stream transport protocol supports remote management of client communication sessions and remote configuration and execution of audio and graphic rendering engines, as well as switching of data streams in response to instructions (also referred to as definitions) that are received from a remotely hosted virtual area application. The stream transport protocol is efficient in connection and disconnection, as well as in transport. In some examples, the stream transport protocol provides a connection-oriented, encrypted connection over a transport protocol (e.g., UDP, TCP, HTTP, and PPP). The stream transport protocol additionally provides between a client application and the transport layer a reconnection mechanism that automatically attempts to reestablish failed connections without intervention by the client application, thereby adding reliability on top of an inherently unreliable communication protocol.

Figure 2A:
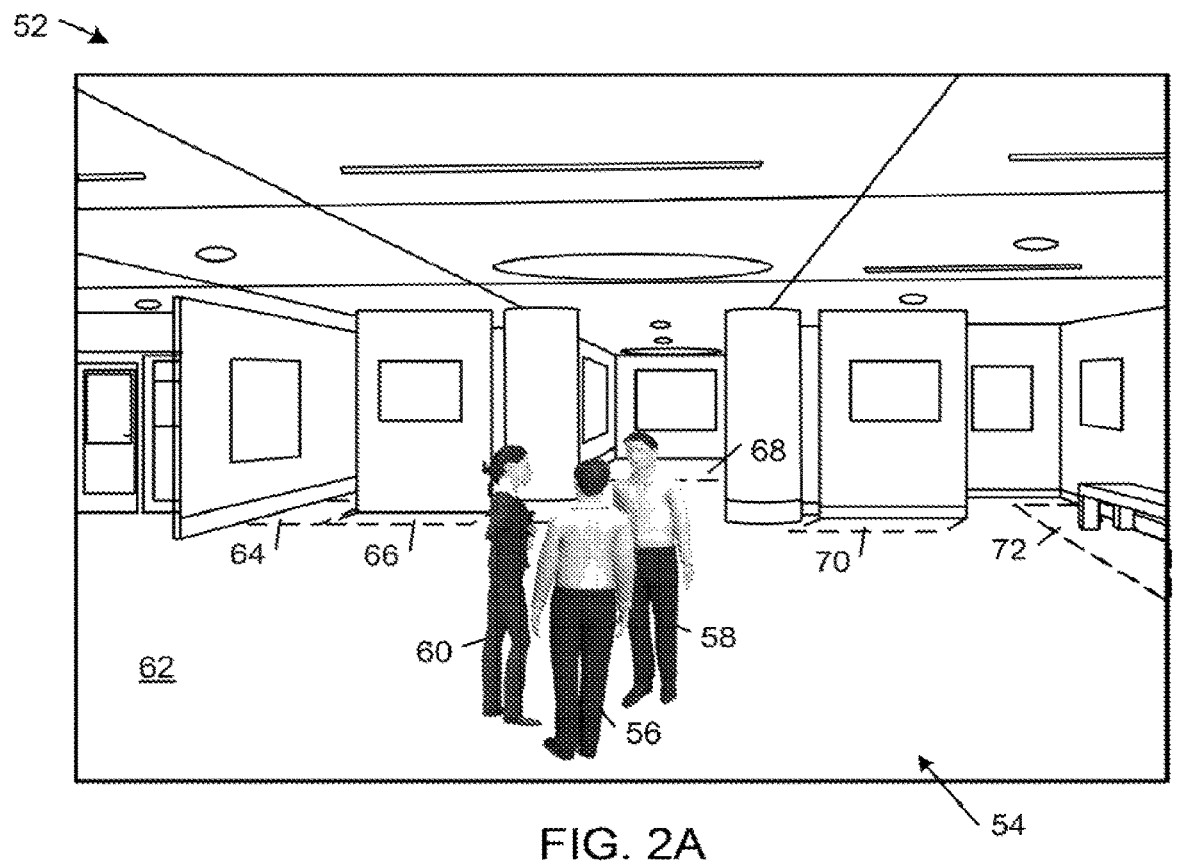
FIG. 2A is a diagrammatic view of an example of a graphical user interface showing a perspective view of a virtual area.

FIG. 2A shows an example of a graphical user interface 52 that presents a two-dimensional view of a visual virtual art gallery area 54. Communicants are represented in the virtual area 54 by respective avatars 56, 58, 60, each of which may have a respective role (e.g., a curator, an artist, and a visitor) in the virtual area 66. The virtual area 54 includes zones 62, 64, 66, 68, 70, 72. (During a typical communication session, the dashed lines demarcating the zones 62-72 in FIG. 2A are not visible to the communicants although there may be visual cues associated with such zone boundaries.) In some examples, each of the zones 62-72 has a respective zone boundary that is associated with a respective <zone_mesh> tag that has a number of attributes (e.g. <zone>, <stream> and <sink> tags) in accordance with the COLLADA Streams Reference specification described in U.S. Pat. Nos. 7,769,806 and 7,844,724. In other examples, zones are associated with one or more respective control channels on which data streams of respective data types are sourced from the zones and/or control channels that are published in the zones and can be subscribed to by network nodes in the zones.

Figure 2B:
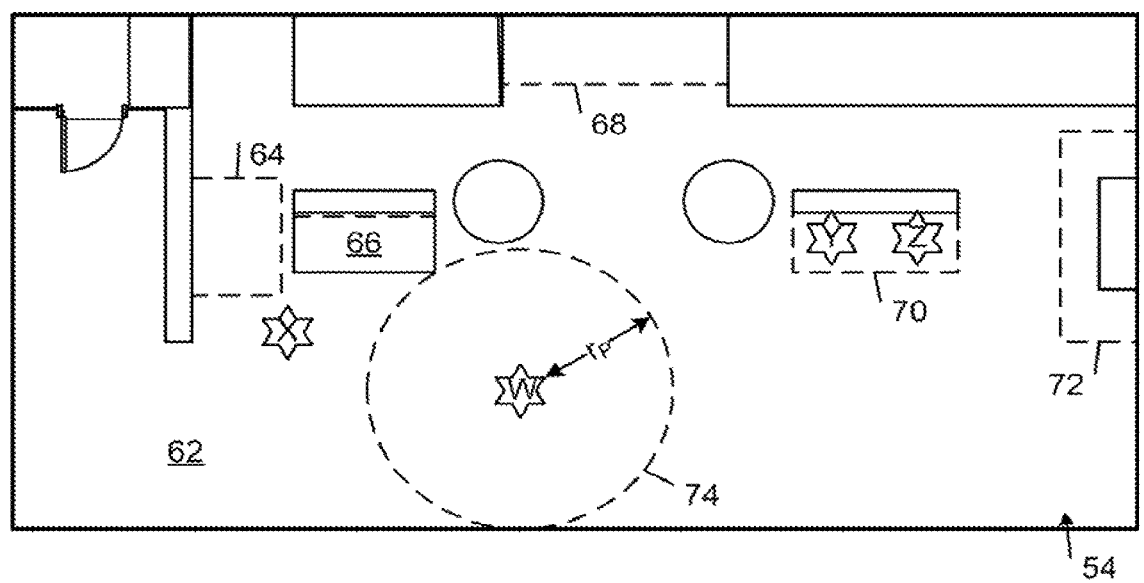
FIG. 2B is a diagrammatic plan-view of the virtual area shown in FIG. 2A that is populated with four avatar objects.

FIG. 2B shows a plan view of the virtual art gallery area 54 at a time when it is populated with four avatars W, X, Y, and, Z. The avatars W and X are positioned in the zone 62 and the avatars Y and Z are positioned in the zone 70. For the purpose of this illustrative example:

each of the avatars W-Z is associated with voice, video, and chat source types and sink types;

the switching rules for zone 62 specify that each voice source that is associated with an avatar within the zone 62 is to be connected to every voice sink within the zone 62, each video source that is associated with an avatar within the zone 62 is to be connected to every video sink within the zone 62, and each chat source that is associated with an avatar within the zone 62 is to be connected to every chat sink within the zone 62;

the switching rules for zone 70 specifies only that that each voice source that is associated with an avatar within the zone 70 is to be connected to every voice sink within the zone 70; and the server node executes a message handling service for the virtual area 54 that implements, on top of the zone switching rules, a proximity policy rule that only allows connections of sources with compatible sinks that are associated with respective objects that are within a prescribed distance (or radius), $r_P$, of each other in the virtual area.

In this example, the switching rules and the proximity policy rule provide respective switching conditions that determine how the connections between the avatars W, X, Y, and Z are established.

In operation, the message handling service for the virtual area 54 sends instructions for the area client node that is associated with avatar W to connect to the real-time voice, video, and chat streams that are sourced from the area client node that is associated with avatar X whenever avatar X is positioned within a proximity zone 74, which defined by the prescribed distance $r_P$, around avatar W. Likewise, the message handling service sends instructions for the area client node that is associated with avatar X to connect to the real-time voice, video, and chat streams that are sourced from the area client node that is associated with avatar W whenever avatar W is positioned within the prescribed distance $r_P$ of avatar X. Since avatar X currently is outside the proximity zone 74 of avatar A, and vice versa, the nodes associated with avatars W and X are not connected to each other in the current state shown in FIG. 2B.

Since the zone 70 only allows voice connections, the message handling service sends instructions for the area client node that is associated with avatar Y to connect to only the real-time voice stream that is sourced from the area client node that is associated with avatar Z (assuming the proximity condition specified in the proximity policy rule is satisfied). Similarly, the message handling service sends instructions for the area client node that is associated with avatar Z to connect to only the real-time voice stream that is sourced from the area client node that is associated with avatar Y (assuming the proximity condition specified in the proximity policy rule is satisfied).

Since the switching rules for zones 62 and 70 do not allow connections between zones 62 and 70, the sources and sinks that are associated with avatars W and X are not connected to any of the sources and sinks that are associated with avatars Y and Z, even if the proximity condition specified in the proximity policy rule is satisfied.

In some examples, a non-rendered governance zone typically encompasses a collection of one or more rendered location zones. One or more control channels are defined within a governance zone. A governance zone functions as a "sink" for data sent on the associated control channel, whereas a location zone that specifies the same control channel functions as the "source" of the control channel data. A user who is present in any one of the location zones within a governance zone is also present within the governance zone.

A control channel is a collection of channels that share a common definition that is managed by exactly one area/zone manager, which is a component of the area service (examples of area/zone managers are described in U.S. Provisional Patent Application No. 61/563,088, filed Nov. 23, 2011). A control channel is published by its corresponding zone manager when a communicant enters a zone that the zone manager has responsibility for. For example, a chat control channel describes the chat channels that exist (i.e., the channels that contain the chat data). When a communicant enters a room, the chat control channel publishes the chat channels that are available for the room, the communicant's client communicants application subscribed to a particular chat channel and the chat history was sent down to the client communications application on that channel. A single area/zone manager can manage multiple control channels. When a message is passed from a message handler to a zone manager, the message handler sends the zone manager the ID of the control channel on which the message came on so that the zone manager operate in the correct context defined by the control channel ID.

Figure 3:
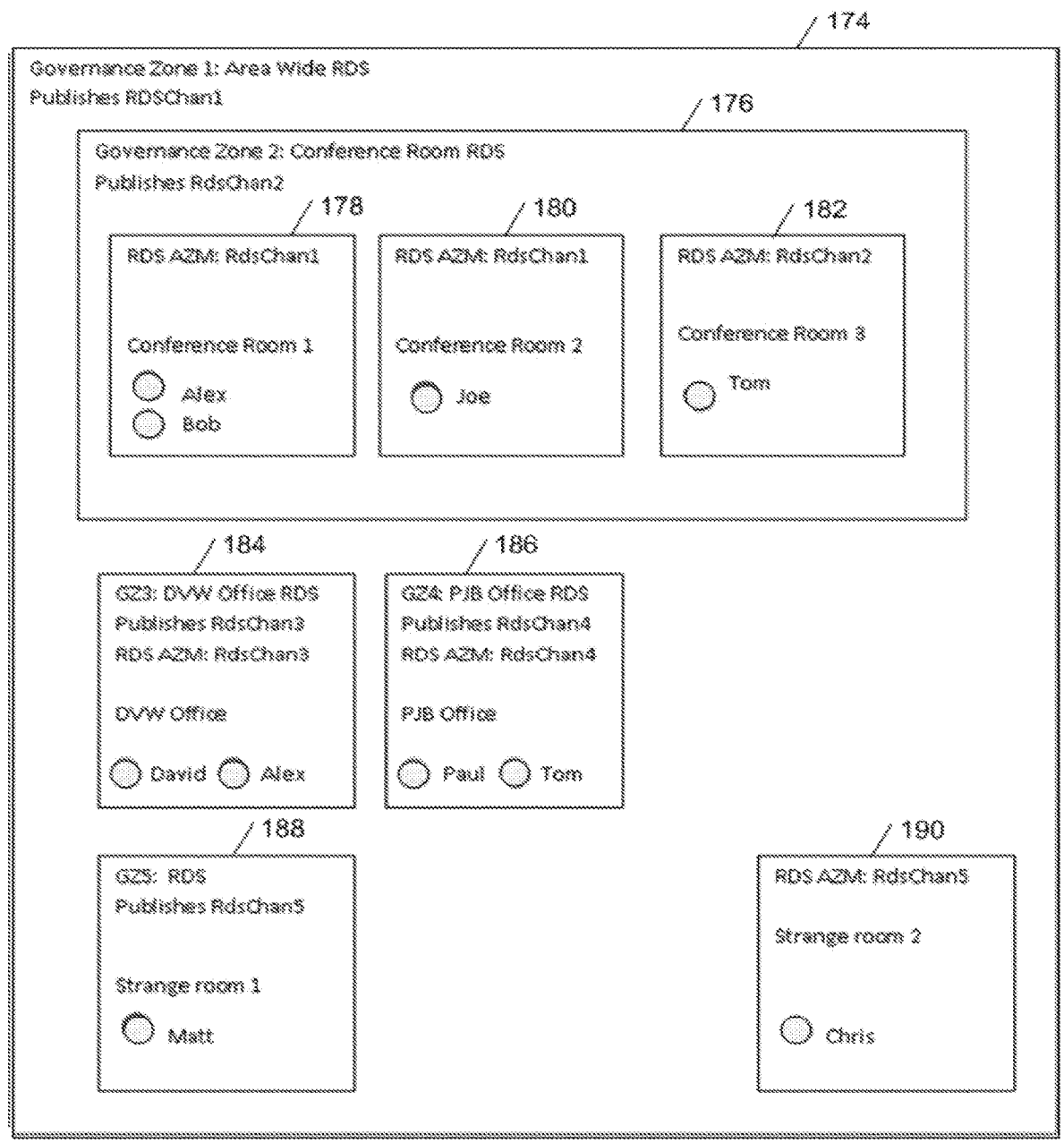
FIG. 3 is a diagrammatic plan view of an example of a zone map.

FIG. 3 shows an example of a realtime data stream (RDS) zone map that defines how RDS streams are sourced and sunk in a virtual area. The virtual area specification may include analogous zone maps for other channels that are defined for the virtual area. Some control channels, such as the session control channel and the area definition channel, only have a single instance. The virtual area includes seven location zones: Conference Room 1, Conference Room 2, Conference Room 3, DVW Office, PJB Office, Strange Room 1, and Strange Room 2. The virtual area also includes five governance zones: a global area wide zone 174, a zone 176 containing all three conference rooms, zones 178, 180, 182, 184, 186 for each office (which coincide with the location zones), and zones 188, 190 for Strange Room 1 and Strange Room 2.

Alex is present in Conference Room 1, GZ1, GZ2 and DVW Office(GZ3), Bob is present in Conference Room 1, GZ1 and GZ2, Joe is present in Conference Room 2, GZ1 and GZ2, Tom is present in Conference Room 2, GZ1, GZ2 and PJB Office/GZ4, David is present in DVW Office/GZ3 and GZ1, Paul is present in PJB Office/GZ4 and GZ1, Matt is present in Strange Room 1/GZ5 and GZ1, and Chris is present in Strange Room 2 and GZ1.

There are five control channels for RDS, one published by each zone except zone 190, which does not publish any RDS data: RDSChan1 is published by zone 174; RdsChan2 is published by zone 176; RdsChan3 is published by zone 184; RdsChan4 is published by zone 186; and RdsChan5 is published by zone 188. RDS activity in a zone is sent out on all RDS zone manager control channels for that zone and delivered to all users present in the governance zones that publish those control channels.

Activity in any of conference room 1 or conference room 2 is published on RdsChan1, which is published by an area/zone manager for governance zone 174. Since every user in the area is in governance zone 174, all users in the area are subscribed to RdsChan1 and see the RDS activity in Conference Rooms 1 and 2 (governance zones 178, 180). An area/zone manager for governance zone 182 publishes activity in Conference Room 3 (governance zone 182) on RdsChan2. In this case, only Alex, Bob, Joe and Tom are in governance zone 176, so only they are subscribed to the channel and see Tom's Activity in Conference Room 3. Since RdsChan1 is not a control channel for Conference Room 3, activity in Conference Room 3 is not broadcasted on that channel. Activity in the DVW Office is sent out on RdsChan3, which is published by governance zone 184 and therefore is only visible to David and Alex since they are the only ones present in that zone. Likewise, activity in the PJB Office is sent out on RdsChan4, which is published by governance zone 186 and therefore is only visible to Paul and Tom since they are the only ones present in that zone. Activity in Strange Room 1 is not visible anywhere, not even in Strange Room 1 since it doesn't specify an RDS Control Channel. Activity in Strange Room 2 is sent out on RdsChan5, which is published by governance zone 188 and therefore is broadcast to Matt in Strange Room 1. Thus, no one can see Matt's activity in Strange Room 1 (not even Matt) and only Matt can see Chris's activity in Strange Zone 2.

As explained above, the zones of a virtual area can be associated with respective switching rules, each of which instructs the area service to connect sources of a respective data stream type that are associated with a designated source zone with sinks of the respective realtime data stream type that are associated with a designated sink zone. Network nodes can establish respective presences in the zones of a virtual area. In some examples, network nodes associated with respective objects (e.g., avatars representing the communicants operating the network nodes) that can be moved to different locations in the virtual area, and the network nodes are present in the zones in which the associated objects are located. The area service administers data stream connections between the network nodes based on the switching rules, the respective sources and sinks associated with the network nodes, and the respective zones of the virtual area in which the objects are located.

In some examples, a virtual area includes multiple zones each of which supports an independent communication session between network nodes in the zone. For example, a virtual area may include zones in which audio, video, and text chat channel connections are established only between the sources and sinks of network nodes that are in the same zone. In these examples, the spatial visualizations of the virtual area that are presented on the client network nodes show, in a single view, all the independent communication sessions that are occurring in the zones of the virtual area. This allows a user to see multiple simultaneous independent communication sessions in a single view and thereby quickly learn who is meeting with whom and the contexts of those meetings (as defined by the zones in which the meetings are occurring).

Figure 4:
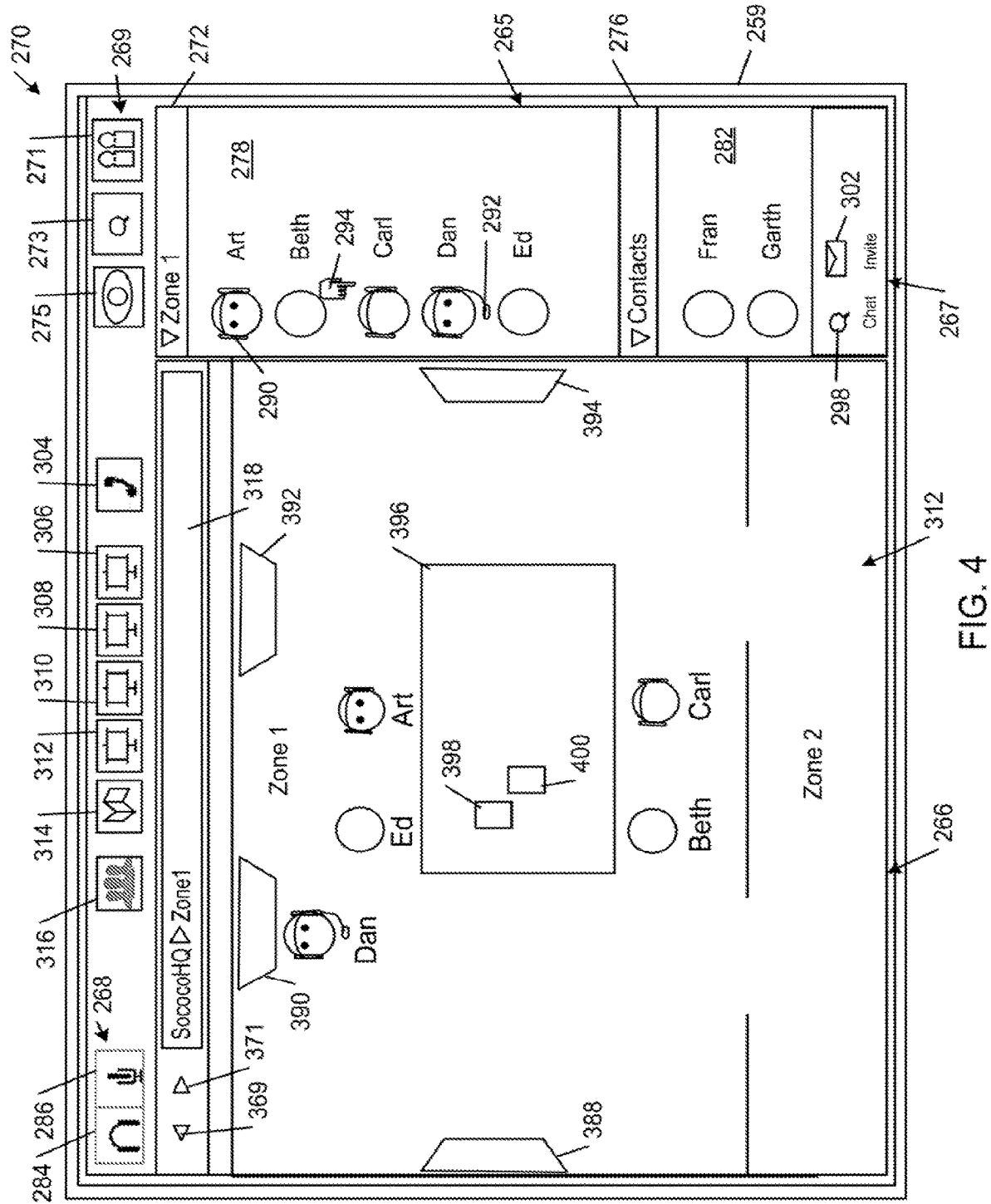
FIGS. 4-5 are diagrammatic views of graphical user interface examples.

FIG. 4 shows an exemplary graphical user interface 270 that is generated by an example of the communications application 26 in a window 259 on a display of the client network node from which a user of the client application ("Art" in this example) is operating. The graphical user interface 270 includes a people panel 265, a viewer panel 266, a people interaction toolbar 267, an audio interaction toolbar 268, and a set of panel view controls 269. The panel view controls 269 include a people panel button 271 for opening and closing the people panel 265, a Chat panel button 273 for opening and closing a Chat panel, and a viewer panel button 275 for opening and closing the viewer panel 266.

The people panel 266 depicts the realtime availabilities and activities of some or all of Art's contacts across different communication contexts. In the example shown in FIG. 4, the people panel 266 shows Art's communicants segmented into a virtual area groups section 278 and a contacts group section 282. The virtual area groups 278 section shows the presence and activity states in each of the area applications 44 of which Art is a member with respect to which at least one of Art and Art's contacts is present, grouped by virtual area application 44. The contacts group section 282 contains all or a selected portion of Art's contacts that are not represented in any of the virtual area groups. In the example shown in FIG. 4, the virtual area groups section 278 includes a single virtual area group (labeled with a header bar 272 entitled "SococoHQ") that identifies all the communicants who have a presence in the area application "SococoHQ," and contains the graphical representations (avatars) of the communicants (including at least one of Art or Art's contacts) who currently have presence in the SococoHQ area application 44. The contacts group section 282 is labeled with a header bar 276 entitled "Contacts" and identifies all of Art's contacts who are not shown in the virtual area groups section 278 (i.e., they either are not members of or not present in SococoHQ). The contacts group section 282 contains graphical representations (avatars) of all of the remaining ones of Art's contacts who are not present in or not members of SococoHQ. In the illustrated example: Art, Beth Carl, Dan, and Ed are members of the SococoHQ area application; and Fran and Garth are contacts of Art who are not present in SococoHQ.

Each communicant is represented graphically by a respective circular sprite that is labeled with a respective user name of the communicant (i.e., "Art," "Beth," "Carl," "Dan," "Ed," "Fran," and "Garth"). Each sprite also may be associated with a respective status line that includes additional information about the communicant. In some embodiments, each status line can include one or more of the following information: location of presence (e.g., a server application or a zone of that sever application); availability (e.g., busy, idle); a status message (e.g., "Out of the office next Wednesday"); and the name of the client node from which the communicant is operating (e.g., "workstation 1" or "mobile phone"). In some embodiments, the ordering of the spatial positions (e.g., from top to bottom) of the communicant avatars in each of the sections 278, 282 is alphabetical by user name. In other embodiments, the spatial positions of the communicant avatars in the area application section 278 are ordered in accordance with the temporal ordering of the communicants in terms of the times when the communicants established t heir respective presences with the server applications. The spatial positions of the communicant avatars in the contacts section 282 may be sorted alphabetically by user name, according to frequency of contact, according to recentness of contact, or according to other sorting or filtering criteria.

The activities of the communicants in the contexts of the area applications 44 may be inferred by the client communications application from activities on various communication channels over which the respective communicants are configured to communicate. The activities on the communication channel are represented in the graphical user interface 270 by visual cues that are depicted in association with the graphical representations of the communicants in the sections 278, 282. For example, the "on" or "off" state of a communicant's local speaker channel is depicted by the presence or absence of a headphones graphic 290 on the communicant's sprite. When the speakers of the communicant who is represented by the sprite are on, the headphones graphic 290 is present (see sprites Art, Carl, and Dan) and, when the communicant's speakers are off, the headphones graphic 290 is absent (see sprites Beth and Ed). The "on" or "off" state of the communicant's microphone is depicted by the presence or absence of a microphone graphic 292 on the communicant's sprite. When the microphone is on, the microphone graphic 292 is present (see sprite Dan); and, when the microphone is off, the microphone graphic 292 is absent (see sprites Art, Beth, Carl, and Ed). The headphones graphic 290 and the microphone graphic 292 provide visual cues of the activity states of the communicant's sound playback and microphone devices. In addition, the current activity state of a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity state of a communicant's text chat channel is depicted by the presence or absence of the hand graphic 294 adjacent the communicant's sprite (see sprite Beth). Thus, when a communicant is transmitting text chat data to another network node the hand graphic 294 is present, and when a communicant is not transmitting text chat data the hand graphic 294 is not present. In some embodiments, text chat data is transmitted only when keyboard keys are depressed, in which case the visualization of the communicant's text channel appears as a flashing on and off of the hand graphic 294.

Members of an area application are able to receive the visual cues of the communicant activities occurring in the context of that area application whether or not the member is present. For example, the graphical user interface 270 that is presented to Art can show visual cues indicating the communication channel activity states of the communicants who are present in SococoHQ (where Art is present) and the communication channel states of the communicants who are present in other areas of which Art is a member but not currently present.

The audio interaction toolbar 268 includes a headphone control 284 that enables Art to toggle on and off the local speakers of the client network node, and a microphone control 286 that enables Art to toggle on and off the local microphone of the client network node.

Additional details regarding embodiments of the people panel 265 are described in U.S. Provisional Patent Application No. 61/373,914, filed Aug. 16, 2010, and U.S. patent application Ser. No. 12/354,709, filed Jan. 15, 2009.

The people interaction toolbar 267 includes a Chat button 298 and an Invite button 302. Selection of the Chat button 298 opens a Chat panel 340 (see FIG. 5) that enables Art to initiate a chat with other communicants who are present in the area application where Art is present (i.e., SococoHQ in the illustrated example). Selection of the Invite button 302 opens an Invite window that enables Art to invite one or more communicants to a selected virtual area location (e.g., an area application or zone within that area application). Additional details regarding embodiments of the methods and functions invoked by the Chat button 298 and the Invite button 302 are described in U.S. patent application Ser. No. 12/354,709, filed Jan. 15, 2009, and U.S. Provisional Patent Application No. 61/373,914, filed Aug. 16, 2010.

In addition to the control and panel elements of the graphical user interface 270 (e.g., the people panel 265, the viewer panel 266, the people interaction toolbar 267, the audio interaction toolbar 268, and the panel view controls 271, 273, 275), the graphical user interface 270 includes a Phone button 304, a respective View Screen button 306, 308, 310, 312 for each viewscreen in the current zone of presence, a Map button 314, and a meeting button 316. The Phone button 304 is associated with telephony related functionality of the platform that enables a user of a Public Switched Telephone Network (PSTN) terminal device to participate in virtual area based communications (e.g., by the PSTN terminal device user calling into a zone of the virtual area or by a user of the communications application 26 to call out to the PSTN terminal device user), as described in U.S. patent application Ser. No. 13/165,729, filed Jun. 21, 2011. Each of the View Screen buttons 306-312 sets the viewer panel 266 to display the content the content being shared in connection with a corresponding one of the viewscreen objects in the current zone of presence or, if no content is being shared in connection with the current viewscreen object, to display a Share button that allows the user to initiate a screen sharing session in connection with the selected view screen object. The Map button 314 sets the view presented in the viewer panel 266 to a map view of the virtual area. The Meeting button 316 sets the view presented in the viewer panel 266 to a meeting user interface for visualizing assemblies of communicants in the virtual area.

FIG. 4 shows an example of the graphical user interface 270 in the Map view mode, which presents in the viewer panel 266 a rendered view of a zone (Zone 1) of the SococoHQ virtual area that is located at the location SococoHQ/Area1, as indicated in the location bar 318. This address indicates that Zone 1 is a zone within the area SococoHQ.

Each of the communicants who is present in the virtual area is represented graphically by a respective avatar that corresponds to the communicant's avatar shown in the people panel 265. The virtual area is represented graphically by a two-dimensional top view of a rectangular space. In some examples, the communicants' sprites automatically are positioned in predetermined locations (or "seats") in the virtual area when the communicants initially enter the virtual area.

Zone 1 includes four view screen props (or "objects") 388, 390, 392, 394 and a table prop 396. Communicants interact with the props by selecting them with an input device (e.g., by single-clicking on the props with a computer mouse, touch pad, touch screen, or the like). The view screen props 388-394 are associated with application sharing functionality of the platform that enables communicants to share applications operating their respective client network nodes. The application sharing functionality is invoked by activating a view screen (e.g., by single-clicking the view screen object with an input device). In some embodiments, the platform provides visual cues that indicate whether or not a communicant is sharing an application over an application sharing channel. In response to a communicant's selection of the view screen prop, the communicant's sprite automatically is moved to a position in the graphical representation of the virtual area that is adjacent the view screen prop. The position of a communicant's sprite adjacent the view screen prop indicates that the communicant currently is sharing or is about to share an application with the other communicants in the virtual area. In addition, the avatar of each communicant who is viewing a shared application is depicted with a pair of "eyes" to indicate that the represented communicants are viewing the content being shared in connection with the view screen props (see, e.g., the avatars of Art and Dan in FIG. 4). The graphical depiction of view screen prop is changed depending on whether or not an active application sharing session is occurring. For example, the depicted color of the view screen may change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

In some examples, one or more of the viewscreen props 388-394 may be associated with respective uniform resource identifiers (URIs) of network resources to enable communicants to interact with and share information associated with the network resources via the application sharing (e.g., web browser sharing) functionality associated with the viewscreen objects as described in U.S. Provisional Patent Application No. 61/444,989, filed Feb. 21, 2011.

The table prop 396 is associated with file share functionality of the platform that enables communicants to upload computer data files to server storage in association with the virtual area and to download data files that are associated with the virtual area from the server storage to the respective client network nodes. In example shown in FIG. 4, there are two document objects 398, 400 that are associated with the table prop 396. The document objects 398, 400 are linked to respective documents that are have been shared in the virtual area and stored in server storage. Any of the document objects 398, 400 may be selected by a communicant (e.g., by double-clicking the document object 398 with an input device, such as a computer mouse) to initiate downloading of the associated document to the communicant's client network node. Additional details regarding the structure, function, and operation of the table prop 396 may be obtained from U.S. patent application Ser. No. 12/354,709, filed Jan. 15, 2009.

In the Map view mode, the navigational controls of the graphical user interface 270 allow the user to traverse a path through the virtual environment in accordance with a navigational model that is tied to the underlying spatial hierarchy of virtual area locations and objects (e.g., props) within the locations. The network infrastructure service environment records the path traversed by the user. In some embodiments, the network infrastructure service environment records a history that includes a temporally ordered list of views of the virtual area locations that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the user's current view of the virtual area. In some embodiments, the graphical representation of the depth path includes a respective user-selectable link to a respective view of each of the preceding levels in the spatial hierarchical model of the Virtual area above the current view. The back button 369 corresponds to a backward control that enables the user to incrementally move backward to preceding ones of the zones in the history of the zones that were traversed by the user. The forward button 371 corresponds to a forward control that enables the user to incrementally move forward to successive ones of the zones in the history of the zones that were traversed by the user. Some examples additionally include a placemarks button that activates a placemarking control for storing links to zones and a placemark navigation control for viewing a list of links to previously placemarked zones. In response to user selection of the placemarking control, a placemark is created by storing an image of the location shown in the current view in association with a hyperlink to the corresponding location in the virtual area. In response to a user selection of the placemark navigation control, a placemarks window is presented to the user. The placemarks window includes live visualizations of all locations that have been placemarked by the user. Each of the images in the placemarks window is associated with a respective user-selectable hyperlink. In response to user selection of one of the hyperlinks in the placemarks window, a view of the virtual area corresponding to the location associated with the selected hyperlink is automatically displayed in the browsing area of the graphical user interface 270. Some examples include home button corresponds to a control that returns the user to a view of a designated "home" location in the virtual environment. Additional details regarding the structure, function, and operation of examples of the navigation controls are described in U.S. patent application Ser. No. 12/354,709, filed Jan. 15, 2009.

Figure 5:
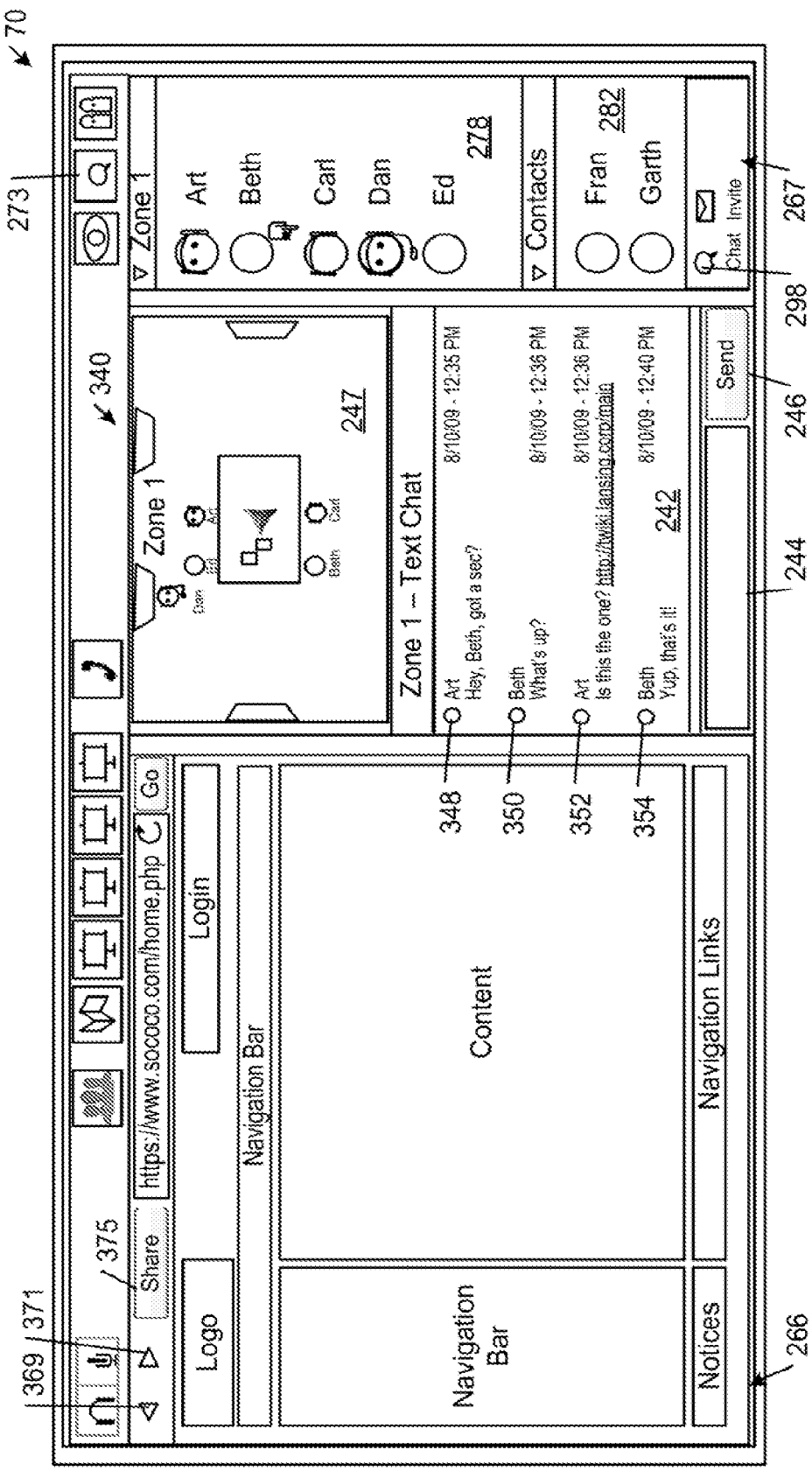

FIG. 5 shows an example of the graphical user interface 270 when the people panel 265 is open, a Chat panel 340 is open, and the viewer panel 266 is open in the browser mode.

Activating the Chat panel button 273 or the Chat button 298 opens the Chat panel 340. When the Chat panel button 273 is activated, the Chanel panel 340 opens to show a chat interface for a persistent virtual chat area for interactions occurring in connection with a respective virtual area. In the example shown in FIG. 5, Art activated the Chat panel button 273 at the time he was present in Zone 1; therefore, the Chat panel 340 shown in FIG. 5 contains the persistent virtual chat area for text chat interactions occurring in connection with Zone 1. When the Chat button 298 is activated, on the other hand, the Chat panel 340 opens to show a chat interface for a persistent personal virtual area for interactions between Art and a selected one of the communicants. Examples of personal virtual areas are described in U.S. patent application Ser. No. 12/509,658, filed Jul. 27, 2009.

The chat interface of the Chat panel 340 includes a chat log area 242, a text box 244, and a Send button 246. The Chat panel 340 also includes a minimap view 247 of the user's current zone of presence (i.e., Zone 1 of the SococoHQ virtual area).

The user may enter text messages in the text box 244 and transmit the text messages to the other communicants who are in the same chat session by selecting the Send button 246. The chat log area 242 displays a log of current and optionally prior events that are associated with Zone 1 of the SococoHQ area application. An exemplary set of events that may be displayed in the chat log area 242 include: text messages that the user has exchanged with other communicants in Zone 1; changes in the presence status of communicants in Zone 1; changes in the speaker and microphone settings of the communicants in the Application 1; and the status of the props (discussed below), including references to any applications and data files that are shared in connection with the props. In the illustrated embodiments, the events are labeled by the communicant's name followed by content associated with the event (e.g., a text message) or a description of the event.

The Chat panel 340 provides a context for organizing the presentation of the events that are displayed in the chat log area 242. For example, in the illustrated embodiment, each of the displayed events is labeled with a respective tag that visually correlates with the appearance of the sprite of the communicant that sourced the displayed event. In particular, each of the events that is sourced by a particular one of the communicants is labeled with a respective icon 348, 350, 352, 354 with a visual appearance (e.g., color-code, or design pattern) that matches the visual appearance of that communicant's sprite. In this example, the color of the icons 348, 352 matches the color of the body of Art's sprite, and the color of the icon 350, 354 matches the color of the body of Beth's sprite.

As mentioned above, the examples that are described herein provide systems and methods for encapsulating assemblies (e.g., meetings, informal gatherings, and the like) of communicants in one or more virtual areas. These examples capture features of ongoing and completed assemblies and visualize those features at different levels of detail.

Figure 6:
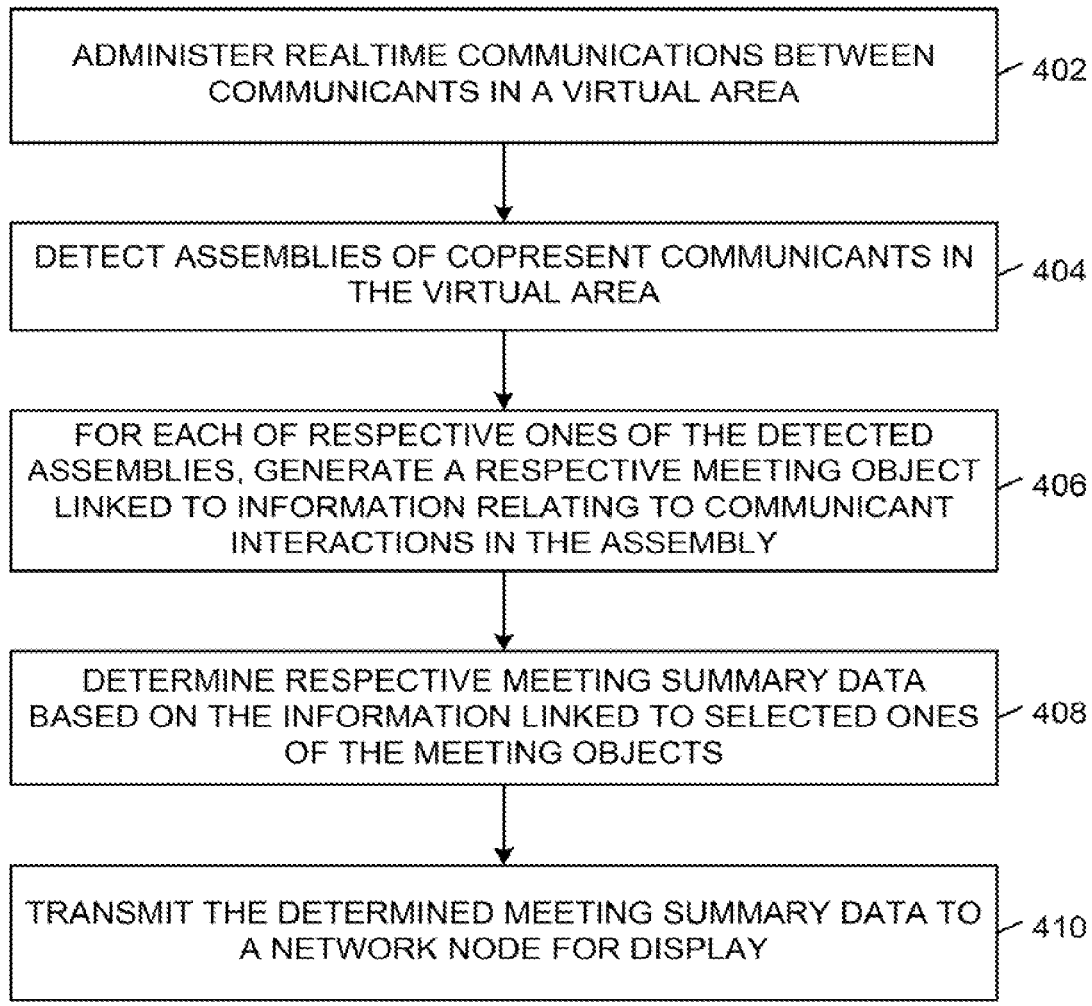
FIG. 6 shows an example of a method.

FIG. 6 shows an example of a method by which the virtual area platform 18 administers the encapsulation of assemblies on behalf of the client network nodes. In accordance with this method, the virtual area platform 18 administers realtime communications between communicants in a virtual area (FIG. 6, block 402). The virtual area platform 18 detects assemblies of copresent communicants in the virtual area (FIG. 6, block 404). For each of respective ones of the detected assemblies, the virtual area platform 18 generates a respective meeting object linked to information relating to communicant interactions in the assembly (FIG. 6, block 406). The virtual area platform 18 determines respective meeting summary data based on the information linked to selected ones of the meeting objects (FIG. 6, block 408). The virtual area platform 18 transmits the determined meeting summary data to a network node for display (FIG. 6, block 410).

An assembly is any gathering of two or more copresent communicants in a virtual area. In some examples, an assembly is a contemporaneous gathering of two or more communicants in respective virtual locations in which they can interact with each other in realtime, where the communicants in the assembly typically are co-located in the same virtual area, co-located in the same zone of a virtual area, or located in different zones of a virtual area that are associated with switching rules that allow one-way or two-way realtime interactions between the zones (see, e.g., U.S. Pat. No. 7,769,806 and U.S. Provisional Patent Application No. 61/603,024, filed Feb. 24, 2012). Depending on the application, the virtual area platform 18 may detect all communicant assemblies or it may selectively detect only those assemblies that satisfy one or more conditions or detection criteria. For example, in some application environments, the virtual area platform 18 detects assemblies of copresent communicants in the virtual area that have a threshold number (e.g., at least three) of copresent communicants and/or last least a threshold amount of time (e.g., thirty seconds).

A meeting object is a data structure that has an identity property that distinguishes it from other meeting objects, a state property that describes the data stored in the object, and a behavior property that describes the methods in the object's interface by which the object can be used. The virtual area platform 18 may link a wide variety of information to a meeting object, including, for example:

- time information (e.g., assembly start and end times, times when communicants joined and left a meeting, times when recordings started and stopped, and times when files are uploaded in association with a virtual area or zone);
- location information (e.g., a virtual area identifier that uniquely identifies a virtual area, and a zone identifier that uniquely identifies a zone of a virtual area, and other information about the virtual location or locations in which the assembly occurred or is occurring);
- participant information (e.g., communicant identifiers that uniquely identify the assembly participants, and other information about the assembly participants);
- information describing interactions in an assembly (e.g., an interaction history);
- information exchanged between participants (e.g.: real-time data streams, such as recorded chat data, audio, data and video data; recorded application sharing data; recorded co-browsing data; and data files uploaded by communicants); and
- information submitted by participants or other communicants for association with respective assemblies (e.g., meeting labels or titles, meeting notes, follow-up tasks, comments and other feedback).

In some examples, the virtual area platform 18 associates with each of respective ones of the meeting objects a respective zone identifier value identifying the zone in which the respective assembly occurred, communicant identifier values identifying respective ones of the communicants who participated in the respective assembly, and at least one time parameter value associated with the respective assembly. In some examples, the virtual area platform 18 records text chat data streams transmitted between communicants participating in a particular one of the assemblies, and associates the recorded text chat data with the meeting object for the particular assembly. In some examples, the virtual area platform 18 records one or more data streams (e.g., an audio data, a video data stream, and an application sharing data stream) that are transmitted between communicants participating in a particular one of the assemblies, and associates the one or more recorded data streams with the meeting object for the particular assembly. In some examples, the virtual area platform 18 associates a file shared by a communicant participating in a particular one of the virtual area platform 18 associates with a respective one of the meeting objects a respective assembly label (e.g., a name or a descriptive title) submitted by a communicant in association with the respective assembly. In some examples, the virtual area platform 18 associates with the given meeting object a respective link to a note submitted in association with the respective assembly. In some examples, the virtual area platform 18 associates with the given meeting object a respective link to a description of follow-up tasks submitted in association with the respective assembly. In some examples, the virtual area platform 18 associates respective assembly status indicators with respective ones of the meeting objects, where each assembly status indicator typically includes an indication of whether the respective assembly is in-progress or has ended. In some examples, the virtual area platform 18 receives one or more feedback submissions regarding a respective assembly in association with the meeting summary data for the respective assembly, and associates the one or more feedback submissions with the meeting object for the respective assembly. In some examples, the virtual area platform 18 receives one or more communicant submissions on the merits of a particular assembly in association with the meeting summary data for the particular assembly, determines a score based on the one or more received communicant submissions, and associates the score with the meeting object for the particular assembly.

The virtual area platform 18 may select all or a filtered set of the meeting objects. In some examples, the virtual area platform 18 selects meeting objects for all concurrent and consecutive assemblies of copresent communicants satisfying zero or more filter criteria. The filter criteria may be one or more conditions on any type of attribute associated with the assemblies through their respective meeting objects including, for example, a time attribute value, a virtual location attribute value, a communicant attribute value, and a data type attribute value. In some examples, the virtual area platform 18 ranks assemblies of copresent communicants in a virtual area, and selects highest ranked ones of the ranked assemblies as the selected assemblies. In some examples, for each of the assemblies, the ranking is based on at least one of: a count of communicants participating in the respective assembly; a count of follow-up tasks associated with the respective assembly; and one or more approval ratings associated with the respective assembly.

In some examples, the process of selecting the meeting objects involves querying the meeting objects based on a query that includes at least one of a zone identifier value, a communicant identifier value, and a time value, and selecting the respective ones of the meeting objects based on results of the querying.

The virtual area platform 18 may determine the meeting summary data for the selected assemblies in different ways. In some examples, the virtual area platform 18 extracts meeting summary data based on queries on the meeting objects. These queries may be predefined or custom queries received from communicants. In some examples, the virtual area platform 18 uses a set of predefined queries to determine meeting summary data at different respective levels of detail (e.g.: assembly label and assembly status only; assembly label, assembly status, and participant list; and assembly label, assembly status, participant list, and meeting notes). In some examples, the virtual area platform 18 determines a time-based ordering of the meeting summary data, from a starting assembly of copresent communicants in the virtual area to an ending assembly of copresent communicants in the virtual area. The starting assembly may be the first assembly in a time-based ordering of the assemblies and the ending assembly may be last assembly in the time-based ordering. The assemblies may be ordered chronologically or reverse chronologically according to a time attribute value (e.g., start time or end time) associated with the assembly. The virtual area platform 18 typically transmits to one or more of the network nodes a respective specification (e.g., an XML specification) of a view for displaying the meeting summary data in accordance with the time-based ordering.

In some examples, the virtual area platform 18 transmits an activity view of the respective meeting objects to the network node, where the activity view shows a time-based listing of respective summaries of meeting objects for all concurrent and consecutive ones of the detected assemblies from a starting one of the detected assemblies to an ending one of the detected assemblies. In some examples, the virtual area platform 18 transmits a timeline view of the respective meeting objects to the network node, where the timeline view shows a time-based listing of respective summaries of meetings objects for highest ranked ones of the assemblies of copresent communicants.

The virtual area platform 18 also typically transmits updates to the requesting ones of the client nodes to reflect changes to existing assemblies and new assemblies of copresent communicants in the virtual area.

In some examples, the virtual area platform 19 sends to each of one or more of the communicants who participated in a particular one of the detected assemblies that has ended a respective follow-up message comprising information relating to the particular assembly. In some examples, the respective message includes one or more of: a summary of the particular assembly; a note associated with the particular assembly; a follow-up task associated with the particular assembly; and an indication of submitted evaluations of the particular assembly.

Figure 7:
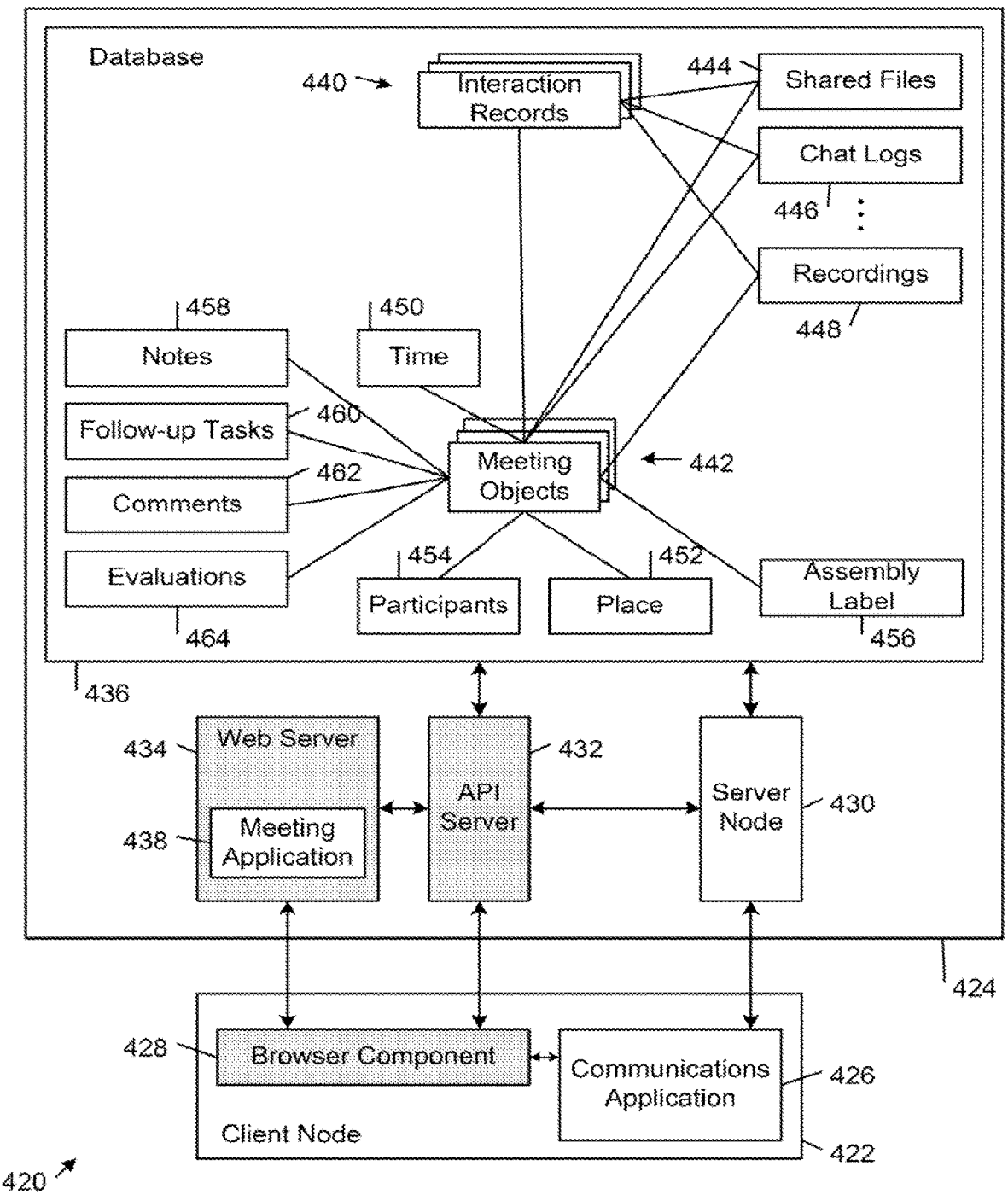
FIG. 7 shows an example of a network communications environment.

FIG. 7 shows an example 420 of the network communications environment 10 that includes an example 422 of the client network node 12 and an example 424 of the virtual area platform 18.

The client network node 422 includes an example 426 of the communications application 26 and a browser component 428. The communications application 426 includes a user interface component that generates a graphical user interface that interfaces the user to the realtime communications and network browsing functionalities of the browser component. The communications application 426 establishes with other client network nodes respective peer-to-peer sessions for exchanging realtime communications (e.g., transmitting realtime audio, video, and application sharing information) and establishes with the server node 430 a server session for exchanging control information, realtime activity information, and state information. The browser component 428 provides a set of web browsing functions, including browser functions, document viewing functions, and data downloading functions. The browser component 428 may be integrated into the communications application 426 or it may be implemented by a separate browser component (e.g., a plug-in) that exposes an API through which the communications application 426 may call methods that are available from the browser component, including browsing methods, document viewing methods, and data downloading methods. In other examples, the functionality of the browser component 428 is provided by a standalone web browser application (e.g., Google Chrome™, Apple Safari®, Mozilla Firefox®, and Microsoft Internet Explorer® web browser applications) that is not integrated with the communications application 426.

The virtual area platform 424 includes an example 430 of the server node 40, an API (Application Programming Interface) server 432, a web server 434, and a database 436.

The database 436 includes interaction records 440 and meeting objects 442. As explained above, each interaction record describes the context of an interaction between a pair of communicants. In addition to identifying the communicants involved, the place of interaction, and start and end times of the interaction, an interaction record also may include links to other information relating to the interaction, including any shared files 444, chat logs 446, and recordings 448. Each meeting record describes information relating to a particular assembly of copresent communicants. In some examples, this information includes time information 450, place information 452, participant information 454, and links to other information relating to the interaction, including any assembly label information 456 notes 458, follow-up tasks 460, comments 462, evaluations 464, shared files 444, chat logs 446, and recordings 448. In some examples, the server node 430 manages the collection of information that is incorporated into the interaction records 440 and the meeting objects 442. In these examples, the server node 430 monitors communicant interactions in a virtual area and stores data relating to those interactions in memory. Whenever a pair of copresent communicants is detected, the server node 430 generates interaction records 440 from the information stored in memory on a regular interval. Similarly, whenever an assembly of copresent communicants is detected, the server node 430 generates meeting records 442 from the information stored in memory on a regular interval. Thus, in these examples, the interaction records 440 and the meeting records are different views on the same communicant interaction data that is stored in memory.

The API server 432 includes one or more libraries of functions that manage accesses to the database 436. In some examples, the API server 432 provides a REST (REpresentational State Transfer) style of web API through which the server node 40 and the web server 434 are able to create, read, update, and delete entries in the database 436. In some examples, the API server 432 stores and organizes the interaction record and meeting object data in accordance with the pseudo file system described in U.S. patent application Ser. No. 12/418,243, filed Apr. 3, 2009, that introduces a relational database in place of the traditional //hostname/drive/path/name.ext parser and associated bit field locator. In these examples, the pseudo file system provides an alternate technique for locating bit fields (the content normally associated with a filename in a traditional file system). These examples use the following identification syntax:

//hostname:dbname "query"

where //hostname is as above, and dbname is an optional database name on that host. If the specified database is absent, the query is directed to the host-configured default database. The "query" string has relational database semantics (e.g., SQL semantics). In some embodiments, the schema is based on the following:

| | |
|---|---|
| time start and end absolute times | Each bit field record includes a range of absolute times. A query that specifies a single time returns all of the bit field records whose range includes that time. A query that specifies a range may return one of three sets: the set of all bit fields whose range includes any time within the specified range, those bit fields that are entirely contained within the query range, or those bit fields that are exactly the extent of the range. |
| people list of globally unique identifiers | Each bit field record is associated with one or more people. A query that specifies a unique user identifier returns all of the bit field records whose people list includes that identifier. |
| place list of globally unique identifiers | Each bit field record is associated with one or more places. A query that specifies a unique place identifier returns all of the bit field records whose place list includes that identifier. |
| source locally unique identifier | Each bit field record is associated a source, which is an identifier of a local source of a data stream or other data. The source allows multiple data streams from the same network node to be distinguished from one another. A query that specifies a source returns all of the bit field records whose source matches that identifier. The source identifier need only be locally unique (only one per place at a given time). Source identifiers are typically strinQs. |
| name locally unique identifier | A simple string associated with a bit field. May include an ext, in which case it becomes a formatted string. A query based on a name or portion of a name returns the bit field records that generate hits based on text search criteria. |
| location unique value | A locator for the bit field in physical storage |

An example of a code implementation uses the C programming language command fopen as follows:

popen("//hostname:dbname'unique query'")

Execution of this command opens a stream of, for example, 8, 16 or 32 bit, words that can be read into a buffer, processed out of the buffer, and that process repeated until the stream is exhausted or closed. In these embodiments, a query of a single time, a single place, a single source or name is always unique if it exists (i.e. it returns zero or one records). Any other query returns zero or more records. If there are multiple candidate bit fields, the returned record set may be parsed and processed, records displayed to a user and picked from a list, or the query further refined based on the time, people, place or source fields. Once uniqueness is achieved, the location value can be handed to the storage system and provide a stream to the caller, or deliver the entire bit field as a unit.

The API server 432 can retrieve a particular one of the data files based on results of a query on the interaction records 440 and meeting objects 442 requested by a particular network node. In response to the request, the API server 432 typically transmits a storage location identifier associated with the particular data file to the particular network node, or it may transmit information derived from one or more of the records identified in a result of the querying to the particular network node.

The web server 434 delivers network resources in response to requests from the browser component 428 executing on the client network node 422. The information resources typically are delivered in accordance with the hypertext transfer protocol (HTTP). The information resources commonly are hypertext documents (e.g., HyperText Markup Language (HTML) documents), which may reference, for example, images, style sheets, scripts (e.g., JavaScripts), and streaming data (e.g., streaming audio data, streaming video data, other streaming information, such as realtime stock quotes and realtime alerts and other event information). The web server 434 hosts a meeting application 438 that delivers user interface content and functionality to the browser component 428 on the client network node 422. In this process, the web server 434 delivers HTML documents, style sheets, and scripts from which the browser component 428 creates a meeting application user interface for retrieving information from and sending information to the meeting application 328. In some examples, the meeting application user interface is generated in a pane of a communications user interface generated by the communications application 426.

Realtime communications between the various nodes 422, 430, 432, and 434 may be carried over a realtime transport layer. In some examples, instead of receiving updates on polling or on page load, some examples receive updates in realtime using any of a variety of technologies (e.g., Socket 10 or WebSockets). In some examples, realtime audio and video streams may be rendered in accordance with any of a variety of realtime rendering technologies (e.g., HTML5 audio or video tags, or Flash audio or video interfaces).

Figure 8:
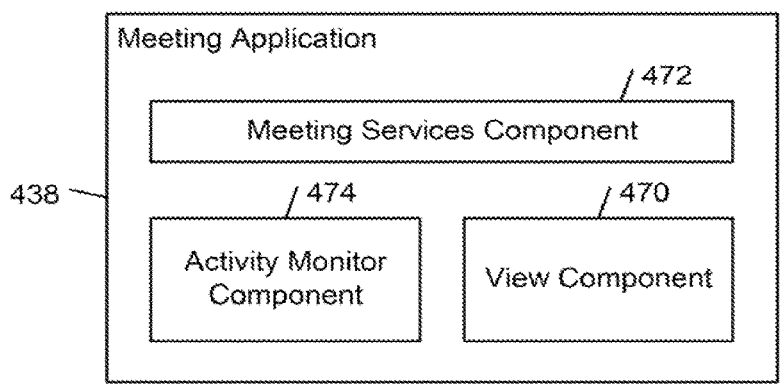
FIG. 8 shows an example of a meeting application.

FIG. 8 shows an example of the meeting application 438 that runs on the web server 434 and includes a view component 470, a meeting services component 472, and an activity monitor component 474. The view component 470 delivers user interface content and functionality to the browser component 428 on the client network node 422. The meeting services component 472 manages the creation, reading, updating, and deleting of data associated with the meeting objects 442, including the meeting objects themselves and information linked to the meeting objects responsive to requests received from the browser component 428 on the client network node 422. In some examples, each of the meeting objects 422 is associated with a respective unique identifier (e.g., a universally unique identifier, UUID) and the information that is linked to a meeting object is represented by an endpoint in the API server 432 that allows the meeting services component 472 to perform one or more database operations on that information (e.g., create, read, update, and delete). For example, the notes that are associated with a meeting object that is created for an assembly in the Sococo-HQ virtual area and has the UUID "meetingID_001" may be retrieved by the meeting services component 472 with a request to the API server 432 that includes the endpoint "/space/sococo-hq/meetings/meetingID_001/notes." Through requests sent to the API server 432, the activity monitor component 474 monitors changes to assemblies and their respective meeting objects. The activity monitor component 474 informs the view component 470 of any changes, and the view component 470 sends updates to the browser component 428, which updates the user interface presented to the user in the viewer panel 266 of the graphical user interface created by communications application.

In operation, the browser component 428 sends to the web server 434 a request for the meeting application user interface and application logic. The browser component 438 loads the application logic and the meeting application user interface. Based on the application logic, the browser component 428 generates the meeting application user interface in a pane of the graphical user interface of the communications application 426. Based on user input selecting a particular visualization of the meeting object data, the browser component 428 requests meeting object data from the API server 432 (e.g., using Socket IO or WebSockets) and then populates the meeting application user interface with data (e.g., assembly summary data) that it receives from the API server 432. The web server 434 maintains persistent connections with the API server 432 and the browser component 428 so that it can receive updates about assemblies and their objects (e.g., participants joining and leaving an assembly and new information, such as praise, comments, notes, follow-up tasks, and other information that is attached to the meeting objects) from the API server 432 and deliver those updates to the browser component 428 on the client network node 422.

The meeting application 438 provides one or more user interfaces for associating information with meeting objects. In some examples, the meeting application 438 delivers one or more user interfaces that enable a user to specify one or more properties of a meeting object (e.g., an assembly label), specify which types of assembly data should be recorded by the server node 430 and associated with the meeting object, and enter notes, follow-up tasks, comments, praise, and other feedback.

Figure 9:
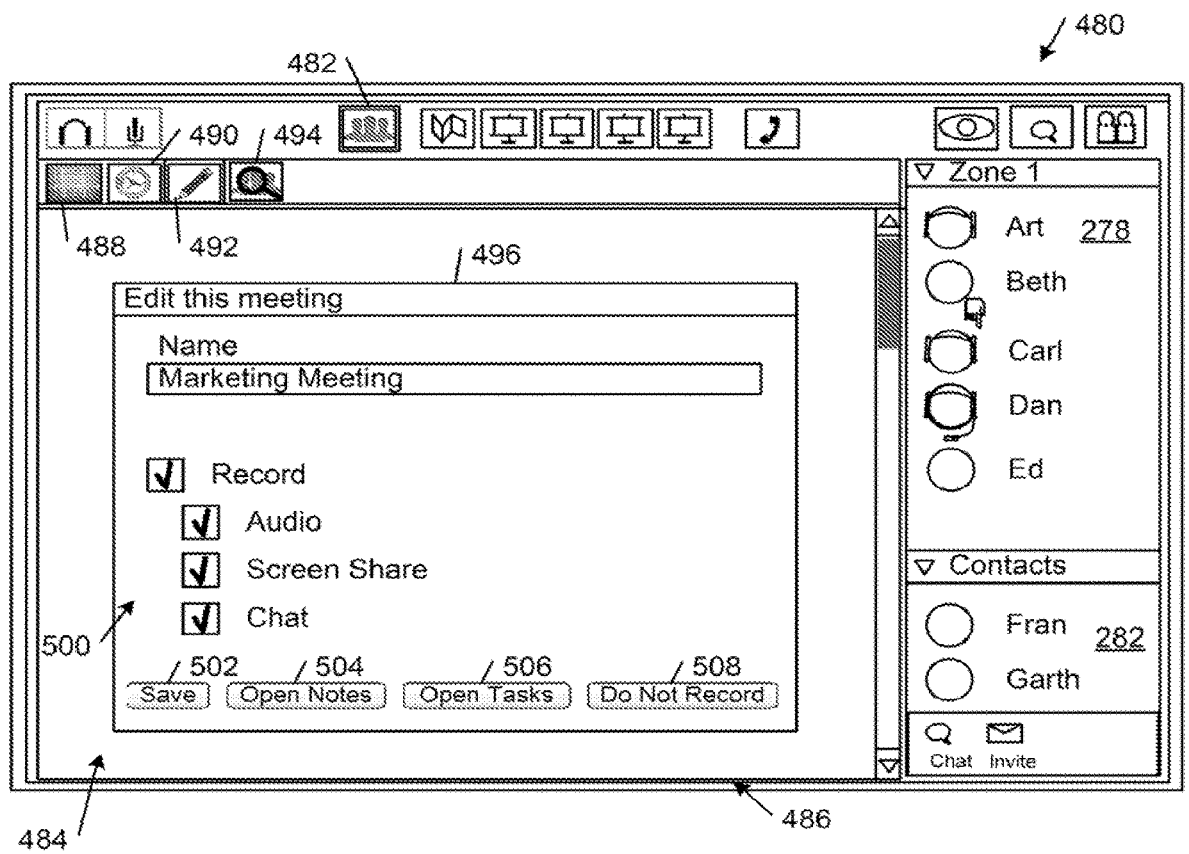
FIG. 9 is a diagrammatic view of an example of a graphical user interface.

FIG. 9 shows an example 480 of the graphical user interface 270 that includes a meeting control 482 for directing the browser component 428 to retrieve the meeting application user interface specification and application logic from the web server 434 and render a meeting application user interface 484 in the viewer panel 486. The meeting application user interface 486 includes a meeting edit control 492 that directs the browser component 428 to bring up a meeting edit interface 496 in the viewer panel 486. The meeting edit interface 496 includes a Name input box 498 for specifying a name (e.g., "Marketing Meeting") for a meeting object associated with a particular assembly (e.g., an ongoing assembly in which the user is present), various check boxes 500 for specifying which types of assembly data (e.g., audio data, screen share data, and chat data) should be recorded by the server node 430 and associated with the particular meeting object, a control 502 for saving the specified meeting properties, a control 504 for opening a notes interface, a control 506 for opening a tasks interface, and a control 508 for stopping the recording of data associated with the assembly.

In some examples, the browser component 428 automatically brings up the meeting edit interface 496 without requiring the user to activate the meeting edit control 492. In one example, upon detection of a new assembly, the server node 430 creates a new meeting object for the assembly and sends a notification and the unique identifier for the new meeting object to the communications application 426 running on the respective client node of each participant in the new assembly. The communications application 426 passes the unique identifier of the meeting object to the browser component 428, which retrieves the meeting application user interface specification and application logic from the web server 434 and renders the meeting edit interface 496 in the viewer panel 486.

As explained above, the examples described herein provide a wide variety of ways in which to capture features of ongoing and completed assemblies and visualize those features at different levels of detail. Exemplary visualizations include an activity view that shows a time-based visualization of all assemblies within a particular domain and a timeline view that shows a scalable visualization of a selected subset of the assemblies within a particular domain (e.g., a domain defined in a space with axes corresponding to communicants, virtual locations, and time). The assembly visualizations may be filtered according to a variety of different attributes that are associated with the assemblies, including by virtual location (e.g., a particular virtual area or a particular zone of a virtual area in which the assemblies occurred), by communicant (e.g., one or more communicants who participated in the assemblies), and by time (e.g., a period during which the assemblies started or ended). The assembly visualizations allow communicants to readily obtain a quick summary of the activities occurring in a particular context (e.g., time, place, virtual location). They also increase the availability of assembly related information (e.g., notes, shared files, recordings, follow-up tasks, comments and other feedback) by allowing communicants to see and retrieve the information associated with the assemblies in a variety of different ways.

Figure 10:
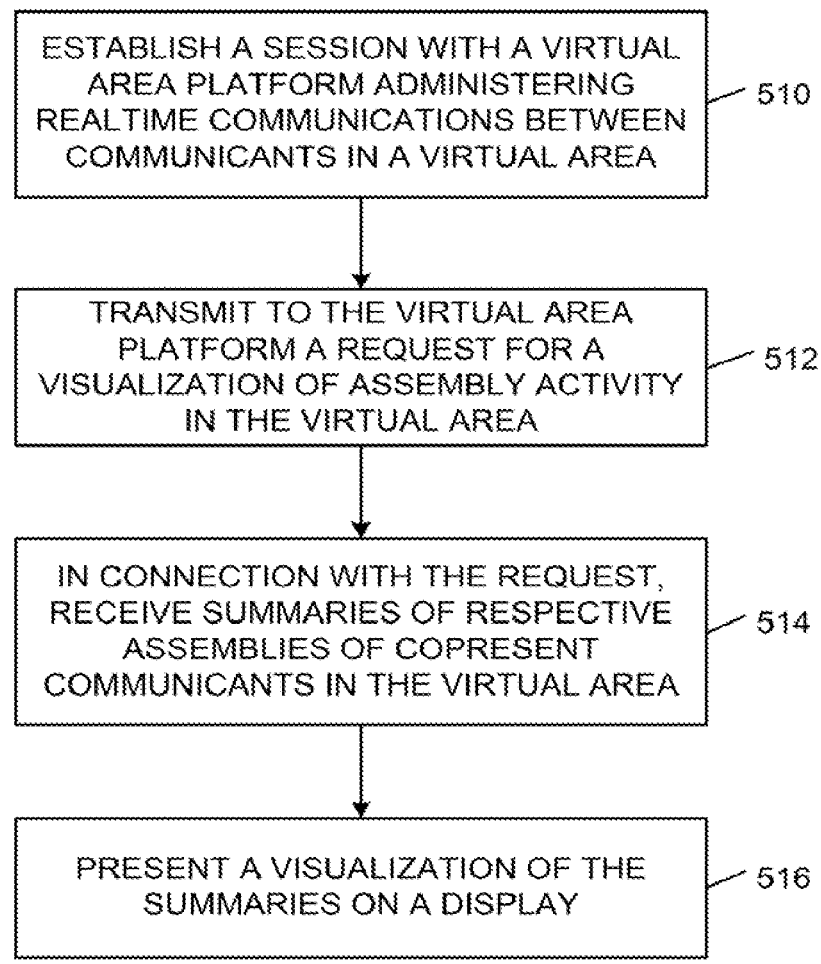
FIG. 10 shows an example of a method.

FIG. 10 shows an example of a method by which a client network node interacts with the server network node 40 in the process of presenting a visualization of one or more ongoing or completed assemblies in a virtual area. In accordance with this method, the client network node establishes a session with the virtual area platform 18 administering realtime communications between communicants in a virtual area (FIG. 10, block 510). The client network node transmits to the virtual area platform 18 a request for a visualization of assembly activity in the virtual area (FIG. 10, block 512). In connection with the request, the client network node receives summaries of respective assemblies of copresent communicants in the virtual area (FIG. 10, block 514). The client network node presents a visualization of the summaries on a display (FIG. 10, block 516).

In some examples, the client network node presents an activity view of the respective summaries. In some of these examples, the activity view shows a time-based listing of respective summaries of all concurrent and consecutive ones of the identified assemblies from a starting one of the identified assemblies to an ending one of the identified assemblies. The starting and ending assemblies may correspond to the first and last assemblies that satisfy certain filtering criteria (e.g., one or more time, virtual location, and communicant parameter values).

In some examples, the client network node presents a timeline view of the respective summaries to the network node. In some of these examples, the timeline view shows a time-based listing of respective summaries of highest ranked ones of the assemblies of copresent communicants. The virtual area platform 18 may rank the summaries in a variety of different ways. In some examples, the virtual area platform 18 ranks summaries based on a score derived from a weighted combination of one or more attributes of the assemblies. Examples of such attributes include:

the number of participants in the assembly (e.g., assemblies with a greater number of participants may be scored higher than assemblies with fewer participants);

the roles of the assembly participants (e.g., assemblies with participants with management roles, such as chief executive office, vice president, and manager, may be scored higher than other assemblies);

the duration of the assembly (e.g., longer assemblies may be score higher than shorter assemblies);

the activity level during the assembly (e.g., assemblies with higher amounts of audio, video, screen share, text chat, and file share activity may be scored higher than assemblies with lower amounts of such activity);

the amount of data associated with the assembly (e.g., assemblies with more notes and follow-up tasks may be scored higher than assemblies with fewer notes and follow-up tasks);

the amount of feedback received in connection with the assembly (e.g., assemblies that receive more comments or praise may be scored higher than assemblies that receive less feedback);

the quality of feedback received in connection with the assembly (e.g., assemblies that receive more praise or less negative feedback may be scored higher than assemblies that receive less praise or more negative feedback); and the association of certain keywords with assemblies (e.g., assemblies associated with keywords—e.g., "important", "critical", and the like—in the label, notes, or chat history may be scored higher than assemblies that are not associated with such keywords).

In some examples, for each of respective ones of the summaries, the client network node provides a respective control for submitting feedback regarding the respective assembly. Responsive to receipt of feedback in connection with a respective one of the controls associated with a given one of the assemblies, the client network node submits to a remote network node (e.g., the API server 432) a message that includes the feedback received in connection with the given assembly. In some of these examples, the feedback may be a comment or an opinion (e.g., an indication of "praise" or "like") on the merits of the respective assembly.

In some examples, the client network node presents in connection with each of respective ones of the summaries at least one of: a respective assembly label; a respective assembly status indication; and a respective link to data associated with the respective summary. In some examples, the client network node presents a respective link to notes or follow-up tasks associated with a respective assembly.

In some examples, the client network node provides an interface for specifying a search for summaries of respective assemblies of copresent communicants in the virtual area in terms of one or more of: one or more communicants present during the respective assemblies; one or more zones of the virtual area containing the respective assemblies; and a time overlapping with occurrence of the respective assemblies.

In some examples, the client network node displays a visualization of a virtual area together with the visualization of the assembly summaries. In these examples, the client network node typically depicts graphical representations of respective communicants who are present in the virtual area. The client network node also typically provides interaction controls for managing realtime communications with one or more of the communicants. In some examples, the virtual area includes zones each of which supports establishment of respective presences of communicants operating respective client network nodes, and the assemblies of copresent communicants occur in respective ones of the zones. In these examples, the visualization of the virtual area typically includes a spatial arrangement of graphical depictions of the zones and the graphical representations of copresent communicants are shown in respective ones of the graphical depictions of the zones.

Referring back to FIG. 9, in addition to the meeting edit control 492, the meeting application user interface 486 also includes an activity view control 488, a timeline view control 490, and a meeting search control 494. The activity view control 488 directs the browser component 428 to request an activity view on the meeting object data from the API server 432 and to present that view in the viewer panel 486. The timeline view control 490 directs the browser component 428 to request an activity view on the meeting object data from the API server 432 and to present that view in the viewer panel 486.

Figure 11:
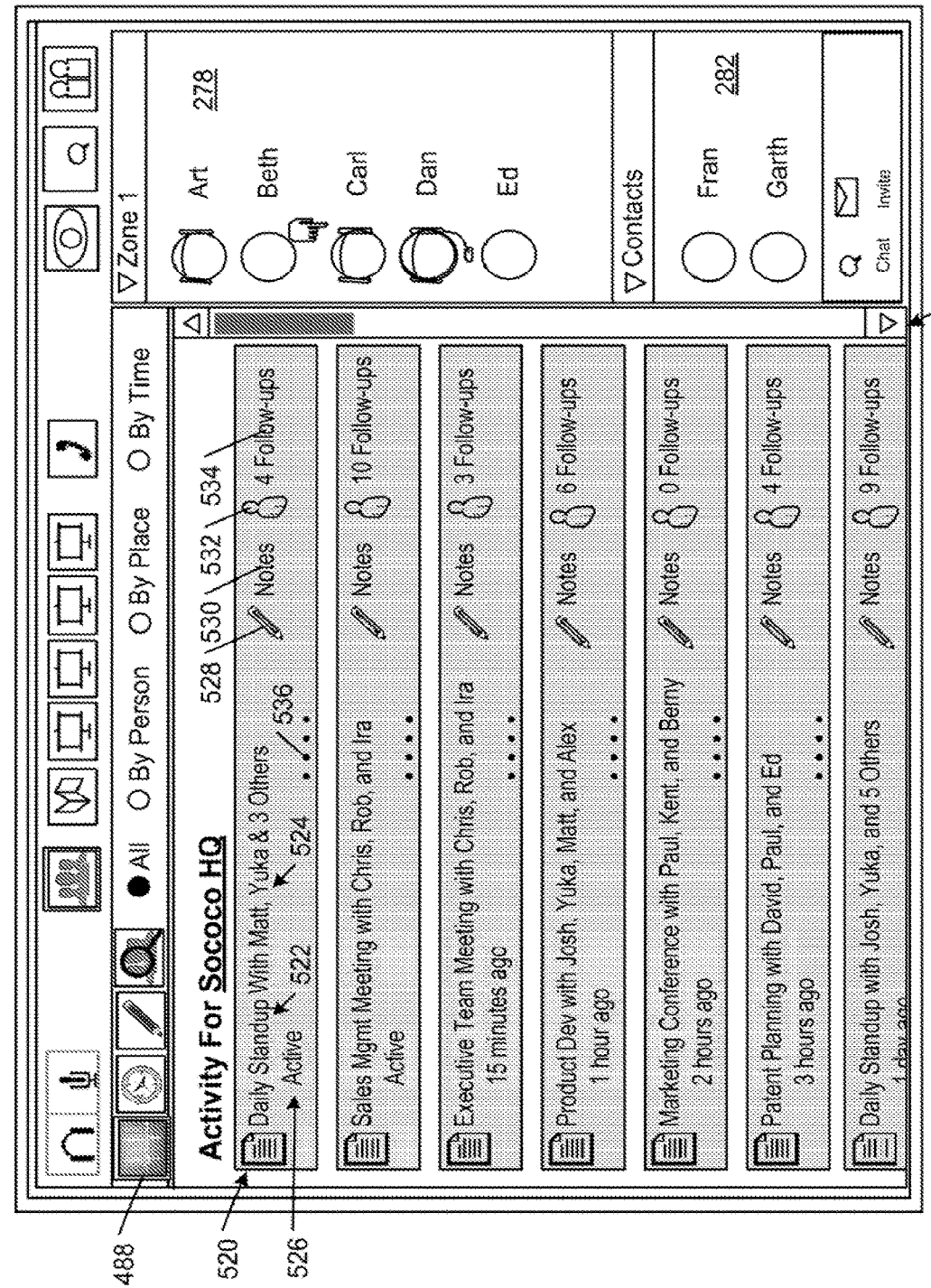

FIG. 11 shows an example of a meeting application interface that the browser component 428 generates in the viewer panel 486 of the graphical user interface 480. The meeting application interface includes a set of filter options 518 for selecting criteria on which to generate a particular view on the meeting object data. The "All" filter option selects the meeting objects for all ongoing and completed assemblies in the virtual area (e.g., SococoHQ); the "By Person" filter option selects the meeting objects that are associated with one or more user-specified participants; the "By Place" filter option, selects the meeting objects that are associated with one or more user-specified zones of the virtual area; the "By Time" filter option selects the meeting objects that meet one or more user-specified time constraints.

In the example shown in FIG. 11, the user has activated the activity view control 488 in connection with the "All" filter option. In response to this selection, the browser component 428 generates an activity view that shows a list of summaries 520 of all ongoing and completed assemblies in the SococoHQ virtual area. In the activity view example shown in FIG. 11, the summaries 520 are presented at a relatively low level of detail that allows the user to quickly determine a few essential features of each assembly. In particular, each summary 520 shows a respective assembly label 522 (e.g., "Daily Standup"), a list 524 of at least some of the assembly participants, a status indicator 526, a link 528 that brings up the meeting edit interface 496 (see FIG. 9) for viewing or changing the data that is associated with the respective assembly, a link 530 that brings up a notes interface for creating, reading, updating, or deleting notes that are associated with the respective interface, a link 532 that brings up a contacts interface for seeing the status of or communicating with one or more of the participants of the respective assembly, and an indication 534 of the number of follow-ups (e.g., tasks) that are associated with the respective assembly.

Figure 12:
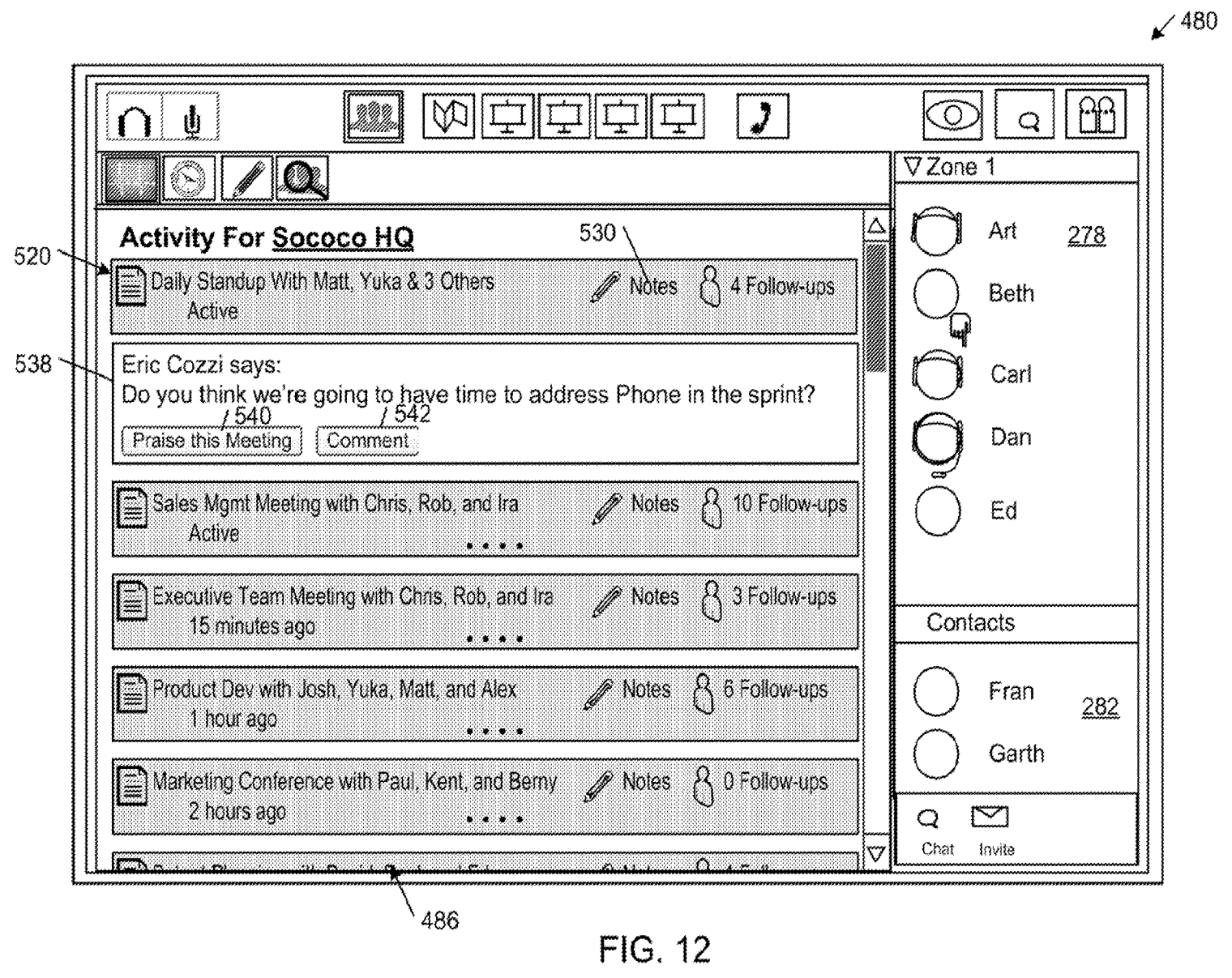

Each summary 520 also includes a hidden collapsible content area that contains additional details regarding the respective assembly and is revealed by selecting a respective ellipsis control 536. FIG. 12 shows an example of a collapsible content area 538 that is revealed in response to user selection of the ellipsis control 536 for the top summary shown the activity view of FIG. 11. The collapsible content area 538 includes a comment that is associated with the respective meeting object along with an identification of the person who submitted the comment (i.e., Eric Cozzi). The collapsible content area 538 also includes a praise control 540 for submitting an indication of praise (or like) for the respective assembly and a comment control 542 for submitting a comment in connection with the respective assembly.

FIG. 13 shows an example of a notes interface 544 that the browser component 428 generates in the viewer panel 486 of the graphical user interface 480 in response to the user activation of the notes link 530 that is associated with a particular summary 520. In this example, the notes interface 544 includes a notes section 546 in which the user can create, read, update, and delete notes that are associated with the meeting object for the respective assembly. The notes interface 544 also includes a follow-ups section 548 that contains a list of follow-ups that are associated with the meeting object for the respective assembly. In the follow-ups section 548, the user can create, read, update, and delete follow-ups that are associated with the meeting object for the respective assembly. The notes interface 544 also includes a control 550 for adding a follow-up to the respective meeting object, a control 552 for adding a praise recommendation to the respective meeting object, and a control 554 for adding a comment to the respective meeting object.

Figure 14:
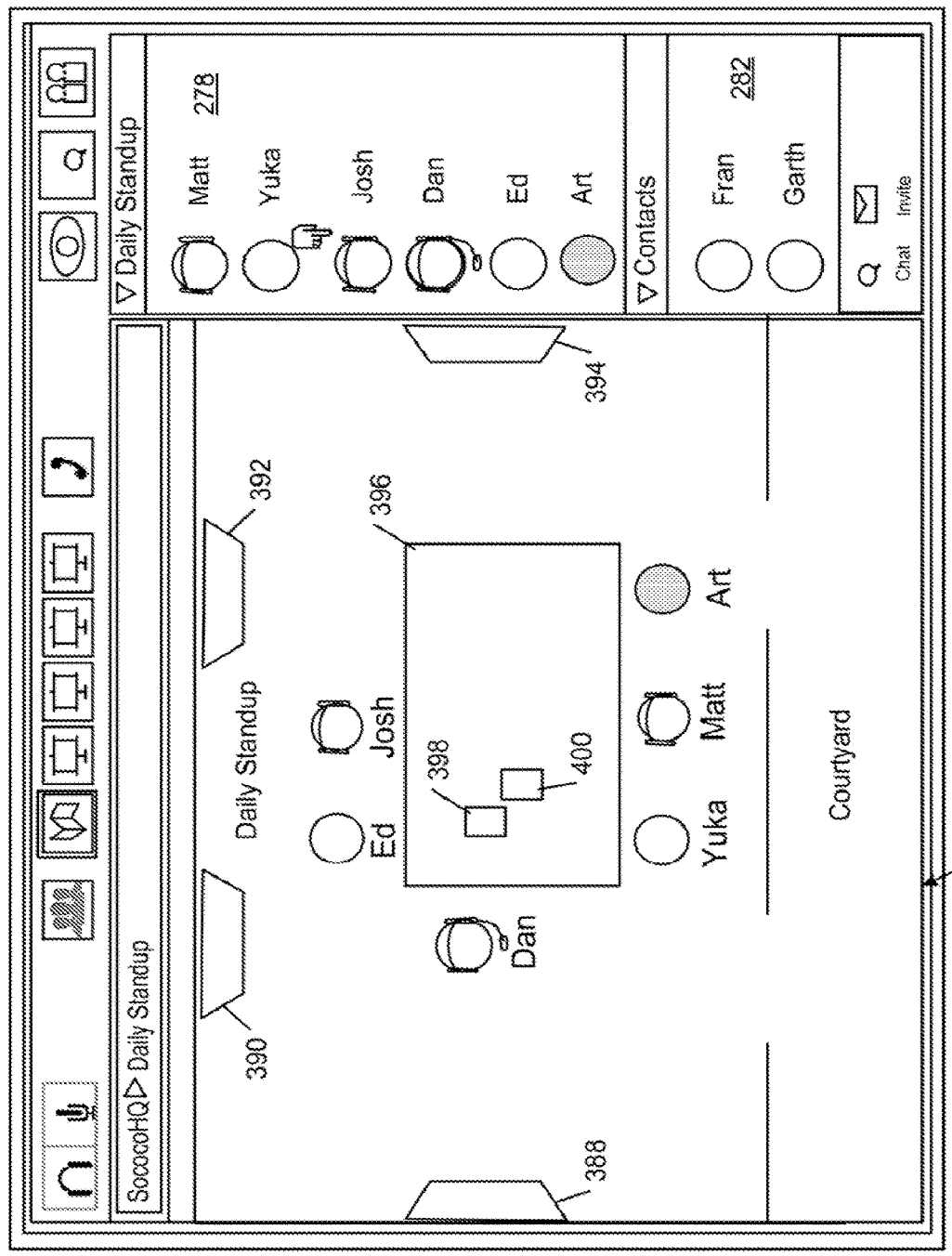

The notes interface 544 additionally includes a title bar 556 that includes a hierarchy of place names that define the context in which the notes are being presented. In the illustrated example, the notes interface 544 is being presented in the context of a current meeting in the Daily Standup zone of the SococoHQ virtual area. In some examples, a user must be present in the particular context of an ongoing assembly in order to create, update, or delete the notes and follow-ups that are associated with the assembly; however, the user need not be present in order to read the notes and follow-ups that are associated with an ongoing assembly. In the illustrated example, the names of the virtual area and the zone (i.e., "Sococo HQ" and "Daily Standup") appearing in the title bar 556 are associated with hyperlinks that, when selected, take the user to a map view of the virtual location corresponding to the selected place name. For example, in response to user selection of the Daily Standup link in the title bar 556, the browser component 528 presents in the viewer panel 486 a map view of the Daily Standup zone of the SococoHQ virtual area, as shown in FIG. 14.

Figure 15:
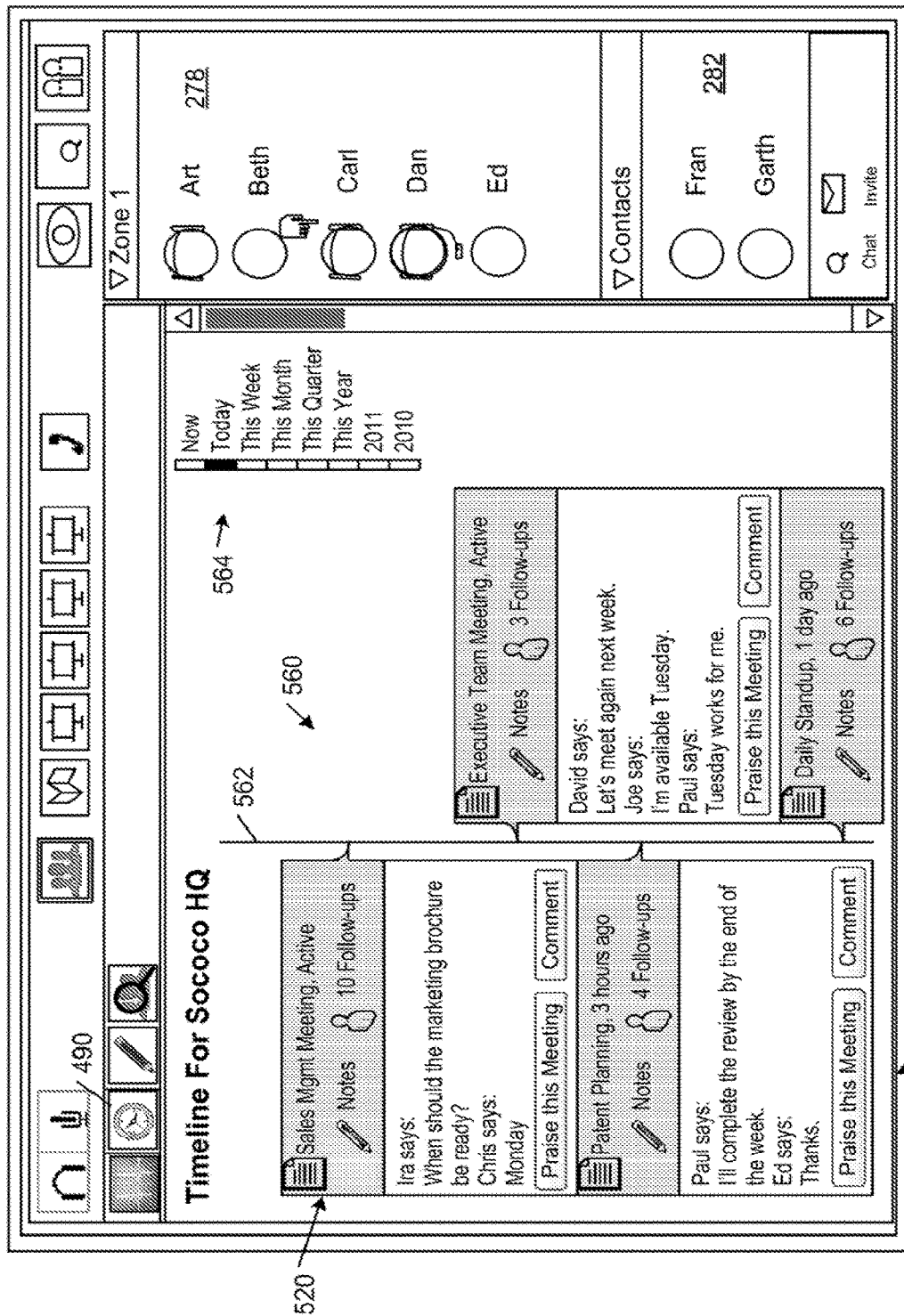

FIG. 15 shows an example of a timeline view that the browser component 428 generates in the viewer panel 486 of the graphical user interface 480 in response to the user activation of the timeline view control 490. In this example, the timeline view shows a selection 560 of the summaries 520 for the assemblies in a user-selected time period that are highest in rank. In the timeline view example shown in FIG. 15, the summaries 520 are presented at the level of detail shown in FIG. 12, in which the collapsible content areas are revealed. The summaries 520 in the selection 560 are arranged in chronological order on either side of a timeline 562. The timeline view includes a control 564 that allows the user to select the desired time period. In the illustrated example, the user has selected "today" as the time period, in which case the timeline view shows the highest ranked ongoing and completed assemblies that occurred today. The timeline view allows users to quickly find the summaries for key assemblies that occurred during the selected time period.

Figure 16:
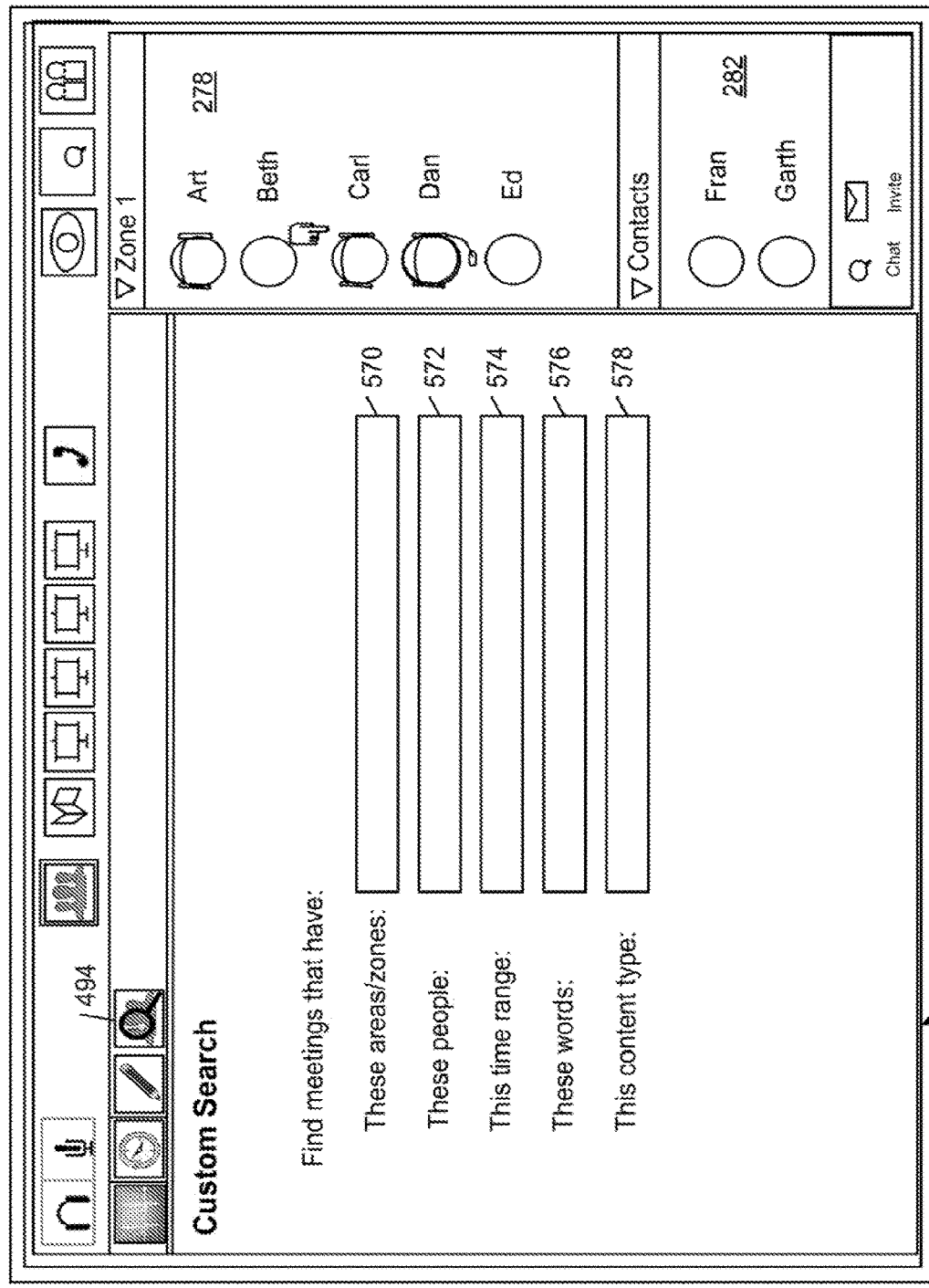

FIG. 16 shows an example of a search interface that the browser component 428 generates in the viewer panel 486 of the graphical user interface 480 in response to the user activation of the search control 494. In general, the virtual area platform 18 is able to search on any data associated with the meeting objects. In the example shown in FIG. 16, the search interface includes respective text boxes 570, 572, 574, 576, 578 in which the user can enter criteria for filtering assemblies by place (e.g., by virtual area, and zone), participants (e.g., e.g., communicant names or roles), time, keywords (e.g., text appearing in notes, follow-ups, and chat logs), and content type (e.g., audio, video, chat, and screen share).

Some examples provide a variety of context-specific ways in which users can query meeting object data in terms of any type of filter criteria (e.g., people, place, and time). In some of these examples, instead of using a complex query scheme, the realtime information presented in the graphical user interface 480 (e.g., realtime information about communicants' states, activities, and virtual locations) presents are leveraged to provide context-specific entry points for users to obtain filtered views on meeting object data. For example, a user may define the context for such a view based on a selection in the graphical user interface 480 (e.g., a selection of an avatar, a zone, a table, a viewscreen, a document, or other object in a virtual area). In some examples, a user can right-click on the avatars of one or more communicants in the people pane or in the map view to bring up a context menu that provides an option for the user to view a filtered selection of the meetings that are associated with the one or more communicants corresponding to the one or more selected avatars (e.g.,the meetings in which the user and the one or more selected communicants were all present, or the meetings that occurred today in which the one or more selected communicants were present). In some examples, the user can right-click on a particular zone to bring up a context menu that provides an option for the user to view a filtered selection of the meetings that are associated with the selected zone (e.g., the meetings that occurred in the selected zone today).

III. Conclusion

Other embodiments are within the scope of the claims.

The invention claimed is:

1. A method, comprising:
administering realtime communications between communicants in a virtual area;
detecting assemblies of copresent communicants in the virtual area;
monitoring collaborations occurring in respective, detected assemblies of the communicants in one or more of the virtual locations, wherein the monitoring comprises, in a database system, recording interaction data relating to interactions between communicants in each assembly;
for each of one or more of the collaborations, deriving a respective set of values of one or more attributes that characterize the collaboration;
ascertaining scores for respective ones of the collaborations based on one or more of the respective sets of attribute values; and
transmitting data for execution by a computer to generate a visualization of one or more of the collaborations based on their respective scores.

2. The method of claim 1, further comprising generating a respective collaboration summary for each of one or more of the collaborations, wherein transmitting comprises transmitting data for execution by a computer to generate a visualization of one or more of the summaries.

3. The method of claim 1, wherein the transmitting comprises transmitting data for execution by a computer to generate a visualization of one or more of the summaries based on their respective scores.

4. The method of claim 1, further comprising:
ranking each collaboration summary based on one or more of the respective scores;
selecting one or more of the summaries based on its rank; and
wherein the transmitting comprises transmitting data for execution by a computer to generate a visualization of one or more of the selected summaries.

5. A system, comprising:
a processor; and
a memory, coupled to the processor, having code stored therein that when executed by the processor causes the processor to perform operations comprising:
administering realtime communications between communants in a virtual area;
detecting assemblies of copresent communicants in the virtual area;
monitoring collaborations occurring in respective, detected assemblies of the communicants in one or more of the virtual locations, wherein the monitoring comprises, in a database system, recording interaction data relating to interactions between communicants in each assembly;
for each of one or more of the collaborations, deriving a respective set of values of one or more attributes that characterize the collaboration;
ascertaining scores for respective ones of the collaborations based on one or more of the respective sets of attribute values; and
transmitting data for execution by a computer to generate a visualization of one or more of the collaborations based on their respective scores.

6. The system of claim 5, wherein when executed, the code causes the processor to perform operations comprising:
generating a respective collaboration summary for each of one or more of the collaborations, wherein transmitting comprises transmitting data for execution by a computer to generate a visualization of one or more of the summaries.

7. The system of claim 5, wherein the transmitting comprises transmitting data for execution by a computer to generate a visualization of one or more of the summaries based on their respective scores.

8. The system of claim 5, wherein when executed, the code causes the processor to perform operations comprising:
ranking each collaboration summary based on one or more of the respective scores;
selecting one or more of the summaries based on its rank; and
wherein the transmitting comprises transmitting data for execution by a computer to generate a visualization of one or more of the selected summaries.

9. A non-transitory, computer program product, wherein the computer program product includes code stored therein that when executed by a processor causes the processor to perform operations comprising:

administering realtime communications between communicants in a virtual area;

detecting assemblies of copresent communicants in the virtual area;

monitoring collaborations occurring in respective, detected assemblies of the communicants in one or more of the virtual locations, wherein the monitoring comprises, in a database system, recording interaction data relating to interactions between communicants in each assembly;

for each of one or more of the collaborations, deriving a respective set of values of one or more attributes that characterize the collaboration;

ascertaining scores for respective ones of the collaborations based on one or more of the respective sets of attribute values; and transmitting data for execution by a computer to generate a visualization of one or more of the collaborations based on their respective scores.

10. The non-transitory, computer program product of claim 9, wherein when executed, the code causes the processor to perform operations comprising:

generating a respective collaboration summary for each of one or more of the collaborations, wherein transmitting comprises transmitting data for execution by a computer to generate a visualization of one or more of the summaries.

11. The non-transitory, computer program product 49, wherein the transmitting comprises transmitting data for execution by a computer to generate a visualization of one or more of the summaries based on their respective scores.

12. The non-transitory, computer program product 49, wherein when executed, the code causes the processor to perform operations comprising:

ranking each collaboration summary based on one or more of the respective scores;

selecting one or more of the summaries based on its rank; and wherein the transmitting comprises transmitting data for execution by a computer to generate a visualization of one or more of the selected summaries.

\* \* \* \* \*